US011520945B2

(12) United States Patent
He et al.

(10) Patent No.: US 11,520,945 B2
(45) Date of Patent: Dec. 6, 2022

(54) MODELING SUPPORT SYSTEM, MODELING SUPPORT METHOD, AND MODELING SUPPORT PROGRAM

(71) Applicant: HITACHI, LTD., Tokyo (JP)

(72) Inventors: Qi He, Tokyo (JP); Chikara Kongo, Tokyo (JP); Makoto Onodera, Tokyo (JP); Masaki Shintani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 960 days.

(21) Appl. No.: 16/069,278

(22) PCT Filed: Dec. 7, 2016

(86) PCT No.: PCT/JP2016/086373
§ 371 (c)(1),
(2) Date: Jul. 11, 2018

(87) PCT Pub. No.: WO2017/122467
PCT Pub. Date: Jul. 20, 2017

(65) Prior Publication Data
US 2019/0018907 A1  Jan. 17, 2019

(30) Foreign Application Priority Data
Jan. 13, 2016 (JP) .............................. JP2016-004409

(51) Int. Cl.
*G06F 30/00* (2020.01)
*G06T 17/20* (2006.01)
*G06F 111/20* (2020.01)

(52) U.S. Cl.
CPC .............. *G06F 30/00* (2020.01); *G06T 17/20* (2013.01); *G06F 2111/20* (2020.01)

(58) Field of Classification Search
CPC ....... G06F 30/00; G06F 2111/20; G06T 17/20
See application file for complete search history.

(56) References Cited

U.S. PATENT DOCUMENTS 5,774,124 A    6/1998  Itoh et al.
6,317,704 B1  11/2001  Furuhata et al.
(Continued)

FOREIGN PATENT DOCUMENTS

JP    08-138082 A    5/1996
JP    11-110586 A    4/1999
(Continued)

OTHER PUBLICATIONS

International Search Report of PCT/JP2016/086373 dated Feb. 21, 2017.
(Continued)

*Primary Examiner* — Bijan Mapar
(74) *Attorney, Agent, or Firm* — Mattingly & Malur, PC

(57) ABSTRACT

A modeling support system stores a combination of a CAD model and a mesh model corresponding to the CAD model; recognizes a shape indicated by the CAD model; and classifies respective parts of the stored CAD model into one of a plurality of groups. The modeling support system also specifies component parts of an input CAD model and specifies groups corresponding to the specified component parts from the specified groups. A similar-shape-model search unit searches and obtains the part of the CAD model having a shape most similar to the shape indicated by the specified component part, from the part of the CAD model in the specified groups. Further, a mesh model generating unit obtains a mesh model corresponding to the obtained part of the CAD model, from the stored mesh model, and generates a new mesh model.

11 Claims, 15 Drawing Sheets

(56) References Cited

U.S. PATENT DOCUMENTS

| | | | |
|---|---|---|---|
| 2006/0235653 A1 | 10/2006 | Onodera et al. | |
| 2007/0242083 A1 | 10/2007 | Kataoka et al. | |
| 2009/0060347 A1* | 3/2009 | Kageura | G06F 30/00 |
| | | | 382/203 |
| 2009/0324095 A1* | 12/2009 | Sakairi | G06F 30/00 |
| | | | 382/203 |
| 2012/0239359 A1* | 9/2012 | Furuya | G06F 30/23 |
| | | | 703/2 |
| 2014/0035809 A1* | 2/2014 | Muto | G06T 17/20 |
| | | | 345/156 |

FOREIGN PATENT DOCUMENTS

| | | |
|---|---|---|
| JP | 2006-301753 A | 11/2006 |
| JP | 2007-122205 A | 5/2007 |
| WO | 2015/092842 A1 | 6/2015 |

OTHER PUBLICATIONS

Extended European Search Report received in corresponding European Application No. 16885070.9 dated Oct. 24, 2019.
Ferreira, A. et al., "Thesaurus-based 3D Object Retrieval with Part-in-Whole Matching", International Journal of Computer Vision, Jun. 10, 2009, pp. 327-347, vol. 89, No. 2-3.

* cited by examiner

REGISTRATION CANDIDATE STORING PROCESS S20

MODELING SUPPORT SYSTEM, MODELING SUPPORT METHOD, AND MODELING SUPPORT PROGRAM

TECHNICAL FIELD

The present invention relates to a modeling support system, a modeling support method, and a modeling support program.

CROSS-REFERENCE TO RELATED APPLICATION

This application claims priority pursuant to 35 U.S.C. § 119 from Japanese Patent Application No. 2016-4409, filed on Jan. 13, 2016, of which is incorporated herein by reference.

RELATED ART

In the manufacturing industry, numerical computer simulation using a finite element method or the like is utilized to perform collision analysis and strength analysis of products. In order to perform the simulation using the finite element method, it is necessary to prepare an analysis model from Computer Aided Design (CAD) data. Such a system for numerically simulating physical phenomena by numerical analysis using computers is called, for example, a Computer Aided Engineering (CAE) system or the like.

The analysis model is usually constituted by a mesh model, and the quality of the mesh model considerably affects the accuracy of simulation results. However, the mesh modeling with sufficient accuracy for simulations requires a lot of modeling steps.

In Patent Literature 1, a technology concerning the mesh modeling is disclosed in which a quadrilateral mesh is automatically generated such that sides of quadrilateral elements are aligned along a boundary as much as possible with respect to a shape which is a mesh modeling object. In Patent Literature 2, a technology is disclosed in which a plurality of types of bubbles are stably arranged in an object region with respect to a shape to be a mesh modeling object and centers of the plurality of types of bubbles are connected to generate a mesh. Further, in Patent Literature 3, a mesh modeling system that enables modeling of a desired mesh model by transformation of an existing mesh model is disclosed in which the mesh is generated by transforming the existing mesh model while maintaining its geometric features.

However, the mesh size and quality (interior angle, edge length and the like) required for the model may differ depending on the purpose of the numerical simulation, a modeling object of the mesh model, and other factors. Therefore, it is necessary to specify parameters such as mesh size and quality according to the above factors. As a result, the mesh modeling requires know-how of experts and enormous number of modeling steps.

In this respect, in Patent Literature 4, a technology for supporting generation of a mesh model for analysis using an existing mesh model is disclosed. That is, a set of existing CAD model and mesh model is stored in a database as a reusable model set, and a CAD model as a mesh modeling object is divided into a plurality of parts. In a case of mesh modeling from each division of the CAD model, it is searched whether the CAD model similar to each part of the CAD model out of the CAD models of the reusable model set included in the database exists, and if the similar CAD model exists, a mesh model corresponding to the similar CAD model is applied. If the similar CAD model does not exist, a mesh is automatically generated. Then, by combining respective mesh models, a mesh model of the CAD model to be modeled is generated.

CITATION LIST

Patent Literatures

Patent Literature 1: JP-A-8-138082
Patent Literature 2: JP-A-11-110586
Patent Literature 3: JP-A-2006-301753
Patent Literature 4: JP-A-2007-122205

SUMMARY OF THE INVENTION

Technical Problem

However, the technology disclosed in Patent Literature 4 has a mechanism for the mesh modeling by reusing the reusable model set. Therefore, when the reusable model sets are accumulated by operating the system disclosed in Patent Literature 4, there arises a problem that a great deal of time is spent on searching for a similar CAD model.

The present invention has been made in view of such circumstances, and an object thereof is to provide a modeling support system, a modeling support method, and a modeling support program capable of generating a mesh model efficiently.

Solution to the Problem

One aspect of the present invention for solving the above problem is a modeling support system including a model storing unit that stores a combination of a CAD model and a mesh model corresponding to the CAD model, a CAD model recognizing unit that recognizes a shape indicated by the CAD model, a CAD model classifying unit that classifies respective parts of the stored CAD model into one of a plurality of groups, on the basis of a recognized shape, a group specifying unit that receives an input of a CAD model, specifies component parts of the input CAD model, and further specifies groups corresponding to the specified component parts from the specified groups, a similar-shape-model search unit that searches and obtains the part of the CAD model having a shape most similar to the shape indicated by the specified component part, from the part of the CAD model in the specified groups, and a mesh model generating unit that obtains a mesh model corresponding to the obtained CAD model, from the stored mesh model, and generates a new mesh model corresponding to the input CAD model using the obtained mesh model.

Advantageous Effects of the Invention

By employing the present invention, a mesh model can be generated efficiently.

DETAILED DESCRIPTION OF THE INVENTION

The following describes in detail embodiments of the present invention, with reference to the drawings.

<Configuration and Function>

Figure 1:
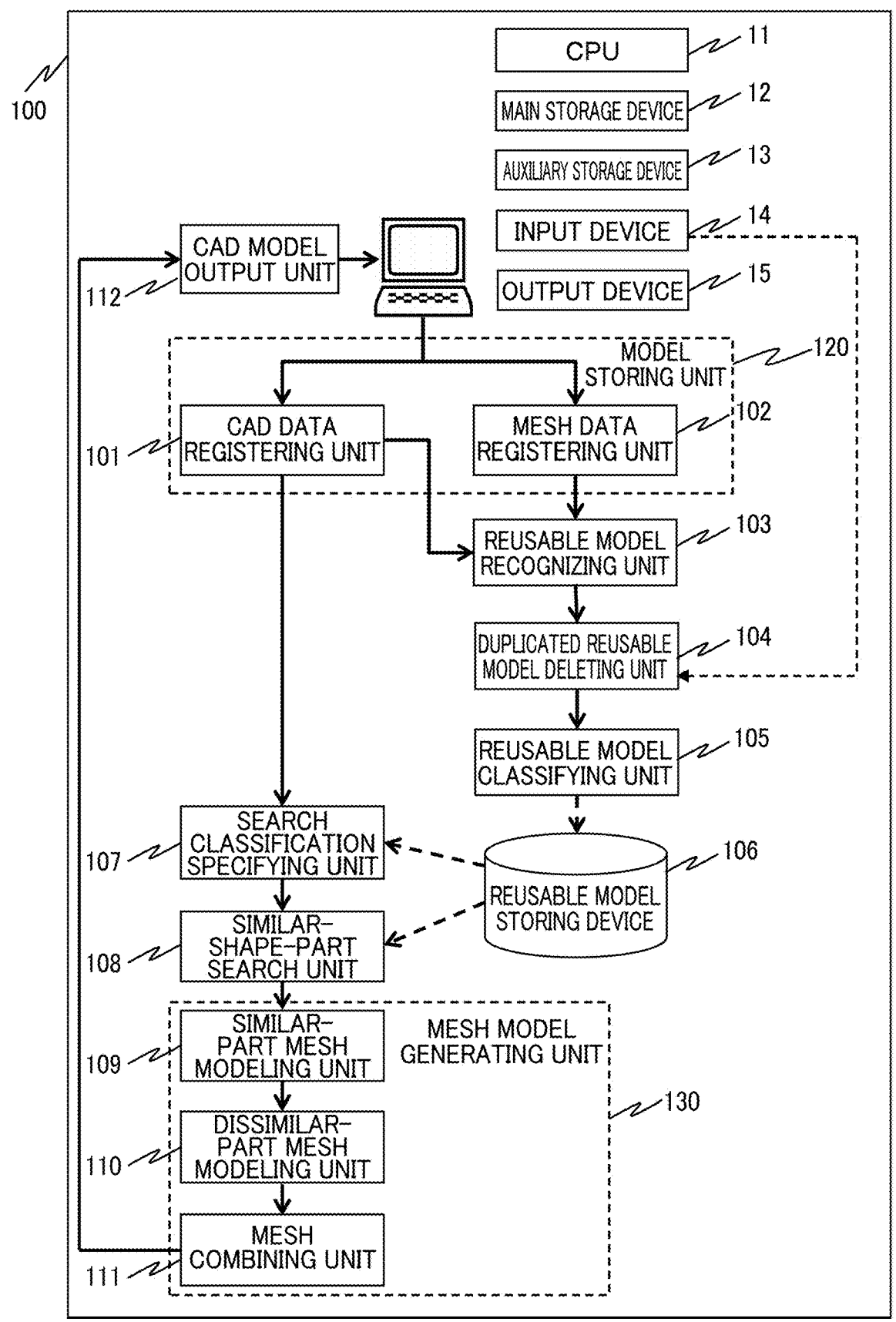
FIG. 1 is a diagram illustrating hardware and software included in the modeling support system according to the present embodiment and functions to be realized by them.

FIG. 1 is a diagram illustrating hardware and software included in the modeling support system according to the present embodiment and functions realized by them. As shown in FIG. 1, a modeling support system 100 includes a computer (Information Processor), and includes, as hardware, a CPU 11 including a processor such as CPU (Central Processing Unit), a main storage device 12 including a memory such as RAM (Random Access Memory), ROM (Read Only Memory), and/or NVRAM (Non-Volatile RAM), etc., an auxiliary storage device 13 including a storage device such as HDD (Hard Disc Drive) and/or SSD (Solid State Drive), an input device 14 including a touchscreen for receiving an input signal from a pointing device, operation buttons and other input devices, and an output device 15 including a liquid crystal display monitor, a printer and other output devices.

Further, each function of the modeling support system 100 is fulfilled by a model storing unit 120, a reusable model recognizing unit 103, a duplicated reusable model deleting unit 104, a reusable model classifying unit 105, a search classification specifying unit 107, a similar-shape-part search unit 108, a mesh model generating unit 130, and a CAD model output unit 112.

The model storing unit 120 includes a CAD data registering unit 101 and a mesh data registration unit 102. The CAD data registering unit 101 stores data of a CAD model indicating a shape of predetermined structural objects or product such as each part of a vehicle. The mesh model registering unit 102 stores data of a mesh model corresponding to the CAD models. The model storing unit 120 stores a combination of the CAD model and the mesh model corresponding to the CAD model as a model set.

Note that, the CAD models and the mesh models may be models input from users and other operators, or may be models that are automatically generated by the modeling support system 100.

The reusable model recognizing unit 103 recognizes the shape indicated by the CAD model stored in the model storing unit 120.

The reusable model classifying unit 105 classifies each part of the CAD model stored in the model storing unit 120 into one of a plurality of groups on the basis of a shape recognized by the reusable model recognizing unit 103.

Specifically, for example, the reusable model classifying unit 105 recognizes the shape of each part of the CAD model and sets the parts of the CAD model having similar shapes to the same group, thereby classifying each part of the CAD model stored in the model storing unit 120 (hereinafter referred to as a reusable model) into one of a plurality of groups.

Further, the reusable model classifying unit 105 classifies each part of the CAD model classified into the group into a part of the CAD model representing the group (hereinafter referred to as a representative CAD model) and a part of the CAD model belonging to the representative CAD model (hereinafter referred to as a subordinate CAD model).

Note that, the reusable models including representative CAD models and subordinate CAD models classified by the reusable model classifying unit 105 are stored in a reusable model storing device 106 including a storage device such as an HDD, an SSD and other storage devices.

Note that, a combination of the reusable model and the corresponding mesh model is stored as a reusable model set. That is, a combination of the representative CAD model and the corresponding mesh model is stored as a representative reusable model set. In addition, a combination of the subordinate CAD model and the corresponding mesh model is stored as a subordinate reusable model set.

The duplicated reusable model deleting unit 104 determines whether each part of the CAD model satisfying a predetermined relation exists when the reusable model classifying unit 105 classifies each part of the CAD model, and classifies only the part of the CAD model selected from each part of the CAD models into one of the plurality of groups.

Specifically, for example, when determining that a quality of a first part of the CAD model is higher than that of a second part of the CAD model or a quality of a mesh model corresponding to the first part of the CAD model is higher than that of a mesh model corresponding to the second part of the CAD model, the duplicated reusable model deleting unit 104 selects the first part of the CAD model and classifies it into one of the plurality of groups.

For example, the duplicated reusable model deleting unit 104 receives the input of the predetermined relation from the user through the input device 14 and classifies each part of the CAD model into one of the plurality of groups according to contents of the received relation.

The search classification specifying unit 107 receives the input of the CAD model from the user or the like, specifies a component part of the input CAD model, and specifies a group corresponding to the specified component part from the groups classified by the reusable model classifying unit 105. Specifically, for example, the search classification specifying unit 107 specifies a shape of the component part of the input CAD model, and specifies the group, to which the CAD group including the specified shape belongs, as a group corresponding to the specified component part, from the groups classified by the reusable model classifying unit 105.

The similar-shape-part search unit 108 searches and obtains a part of the CAD model having a shape most similar to the shape of the specified component part, from the part of the CAD model in the group specified by the search classification specifying unit 107.

The mesh model generating unit 130 obtains a mesh model corresponding to the part of the CAD model, which is obtained by the similar-shape-part search unit 108, from the mesh model stored in the model storing unit 120, and generates a new mesh model (hereinafter referred to as a mesh model to be generated) corresponding to the input CAD model, using the obtained mesh model.

Specifically, the mesh model generating unit includes a similar-part mesh modeling unit 109, a dissimilar-part mesh modeling unit 110, and a mesh combining unit 111.

The similar-part mesh modeling unit 109 obtains a mesh model corresponding to the CAD model, which is obtained by the similar-shape-part search unit 108, from the mesh model stored in the model storing unit 120, and generates a mesh model of a modeling object on the basis of the obtained mesh model.

The dissimilar-part mesh modeling unit 110 generates a mesh model corresponding to the component part specified by the search classification specifying unit 107 when the similar-shape-part search unit 108 fails to obtain the part of the CAD model indicating the most similar shape.

The mesh combining unit 111 combines the mesh model generated by the similar-part mesh modeling unit 109 and the mesh model generated by the dissimilar-part mesh modeling unit 110.

The CAD model output unit 112 outputs the part of the CAD model classified by the reusable model classifying unit 105 and the new mesh model generated by the mesh model generating unit 130 using the part of the CAD model to the output device 15.

Note that, the respective functions in the modeling support system 100 described above are realized by the hardware of the modeling support system 100, or a program stored in the main storage device 12 or the auxiliary storage device 13 to be read and executed by the CPU 11 of the modeling support system 100. The program may be stored in other recording medium such as memory cards and/or optical disks.

In addition, the functions in the modeling support system 100 may be realized by a single information processing device, or a part or all of the functions may be realized by further other information processors. For example, the functions may be realized by a so-called web application.

<Details of the Process>

A process executed by the modeling support system 100 will be described below.

Figure 2:
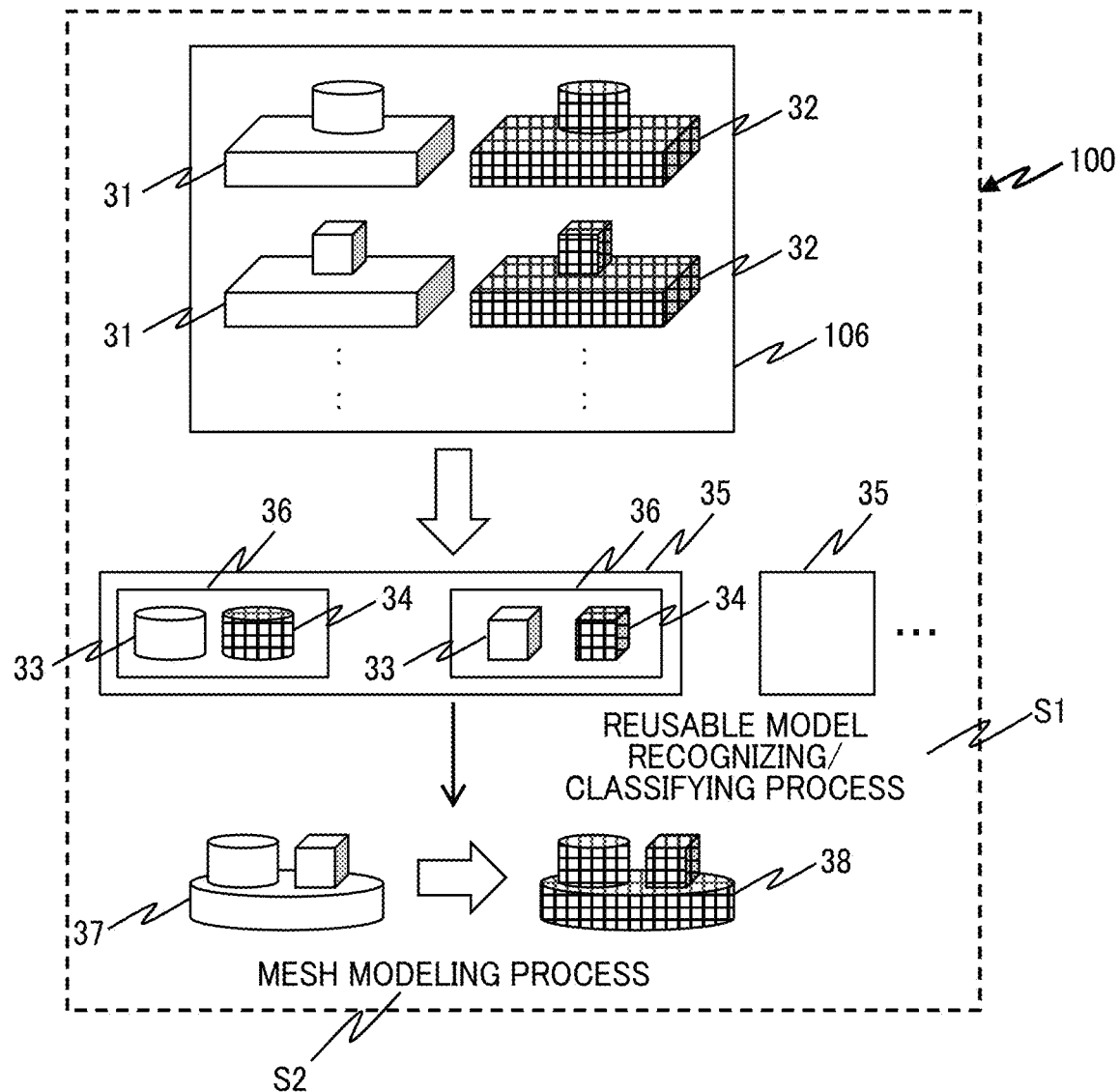
FIG. 2 is a view illustrating a process executed by the modeling support system 100.

FIG. 2 is a diagram for describing the process to be executed by the modeling support system 100. As shown in FIG. 2, the modeling support system 100 stores a CAD model 31 and a corresponding mesh model 32 in the reusable model storing device 106, and executes a process (hereinafter referred to as a reusable model recognizing/ classifying process S1) of recognizing a shape of the CAD model 31 and classifying each part of the CAD model 31 into a plurality of groups 35 on the basis of the recognized shape.

The reusable model 33, which is the classified part, and a corresponding mesh model 34 are recognized as a reusable model set 36.

In addition, the modeling support system 100 executes a process (hereinafter referred to as a mesh modeling process S2) of, from a CAD model 37 input from the user or the like, generating a mesh model 38 corresponding to the CAD model 37 on the basis of the reusable model 33 generated in the reusable model recognizing/classifying process S1.

<Reusable Model Recognizing/Classifying Process S1>

First, the reusable model recognizing/classifying process S1 will be described.

Figure 3:
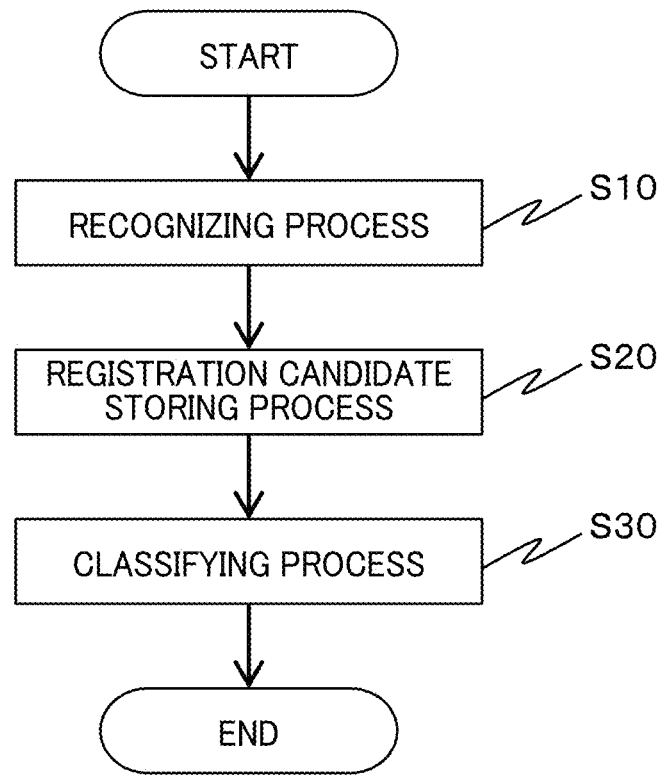
FIG. 3 is a flowchart illustrating a reusable model recognizing/classifying process S1.

FIG. 3 is a flowchart illustrating the reusable model recognizing/classifying process S1. Note that, for example, the reusable model recognizing/classifying process S1 is initiated when the input device 14 of the modeling support system 100 detects a predetermined input by an operator such as a user and other signals.

First, the modeling support system 100 executes a process (hereinafter referred to as a recognizing process S10) of recognizing a partial shape (hereinafter referred to as a reusable part) of the CAD model stored in the reusable model storing device 106 (S10). Then, the modeling support system 100 recognizes the recognized reusable part and a mesh model corresponding to the reusable part as a reusable part set. A specific example of the recognizing process S10 will be described herein.

Figure 4:
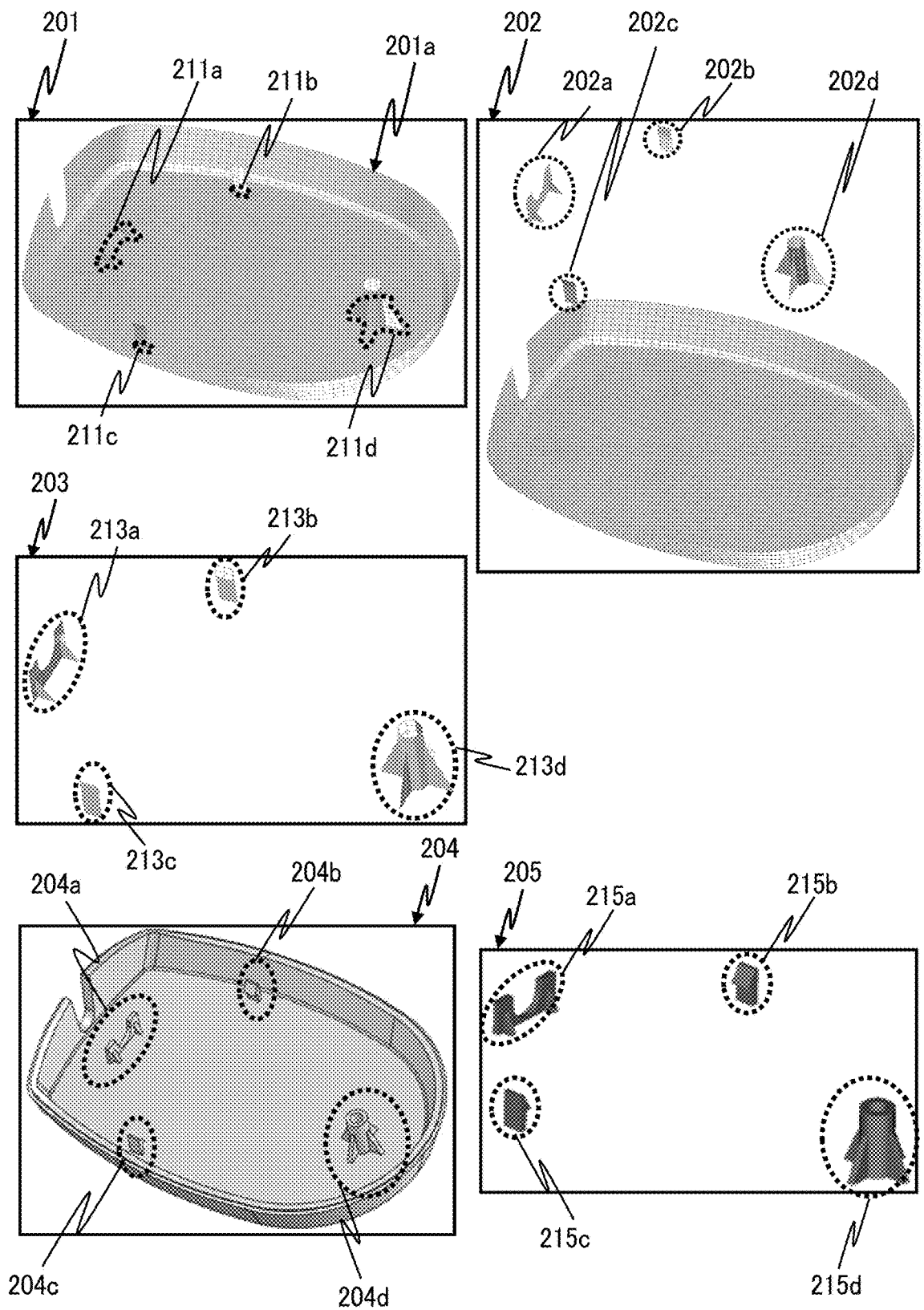
FIG. 4 is a view illustrating a specific example of a recognizing process S10.

FIG. 4 is a view illustrating the specific example of the recognizing process S10. As indicated by reference numeral 201 in FIG. 4, in the present example, assumption is generated that the modeling support system 100 obtained a mesh model 201a from the reusable model storing device 106.

Note that, in the present embodiment, is assumed that all the mesh models are based on a shell mesh (a mesh constituted by quadrilateral elements and triangular elements).

As indicated by reference numeral 201, the modeling support system 100 extracts element edges 211a to 211d (hereinafter referred to as T-connection element edges) in which three elements belong to a side constituting an element of the mesh model 201a. The element edge means the above side.

Next, as indicated by reference numeral 202, the modeling support system 100 separates the mesh with T-connection element edges 211a to 211d, and generates mesh models 202a to 202d after separation. Note that, in FIG. 4, although the separated portions are shown as separated from the mesh model for ease of understanding, the actual positions of the portions do not change while only nodes are multiplexed.

Then, the modeling support system 100 performs grouping on the mesh models 202a to 202d generated after separation for each element group connected to each other. Then, the modeling support system 100 deletes the group including the maximum number of element and then release the grouping of the remaining group.

Then, as indicated by reference numeral 203, the modeling support system 100 performs grouping again into mutually connected element groups, and recognizes the groups subjected to the grouping, as mesh models 213a to 213d (serving as mesh models corresponding to the reusable part).

As indicated by reference numerals 203 and 204, the modeling support system 100 draws straight lines in a normal direction from several points of internal points of each element in the mesh models 213a to 213d and obtains component surfaces 204a to 204d (hereinafter referred to as mesh belonging surfaces) of CAD models intersecting with the straight lines and corresponding to the mesh models.

The modeling support system 100 separates surfaces corresponding to the mesh belonging surfaces 204a to 204d from the CAD model corresponding to the mesh model 201a, performs grouping again with component surface groups connected to each other, and deletes the group having the maximum number of surfaces from the groups subjected to the grouping. Then, as indicated by reference numeral 205, the modeling support system 100 originally restores the component surface group of the separated CAD model, and groups with the component surface groups connected to each other again to generate parts of the CAD model 215a to 215d.

The modeling support system 100 recognizes each of parts of the CAD model 215a to 215d as a reusable part. Then, the modeling support system 100 recognizes the recognized reusable parts (the part of the CAD model 215a to 215d) and the mesh models corresponding to the reusable parts, as a reusable part set.

The modeling support system 100 may recognize the entire CAD model stored in the model storing unit 120 as the reusable part without executing the recognizing process of the partial shape as described above.

<Registration Candidate Storing Process S20>

Next, the modeling support system 100 executes a process (hereinafter referred to as a registration candidate storing process S20) of storing candidates to be registered as reusable models out of the reusable parts (reusable part set) recognized in the recognizing process S10 (FIG. 3).

Figure 5:
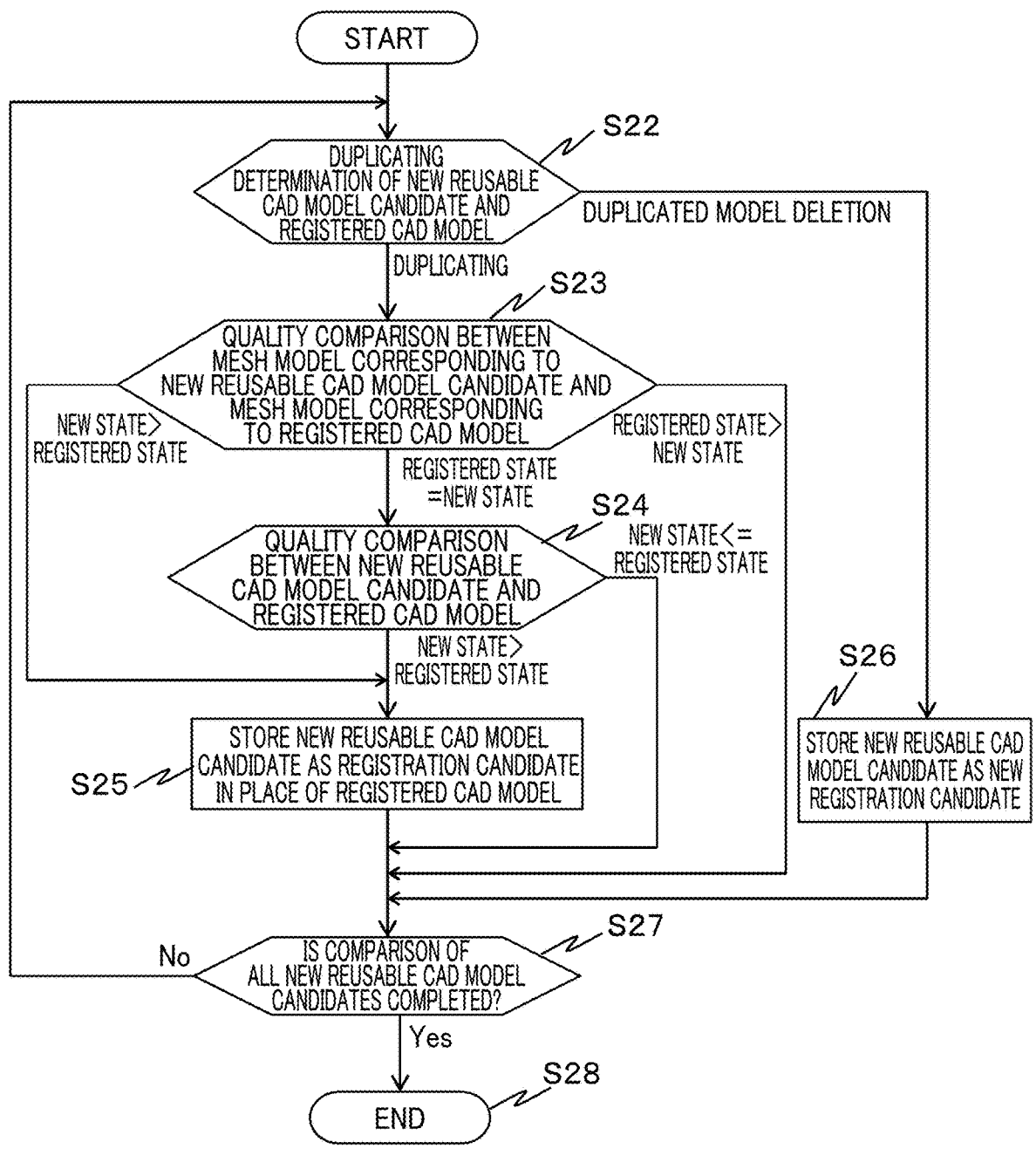
FIG. 5 is a flowchart illustrating a registration candidate storing process S20.

FIG. 5 is a flowchart illustrating the registration candidate storing process S20. As shown in FIG. 5, first, the modeling support system 100 determines whether there are a plurality of parts of the CAD model satisfying a predetermined relation in one reusable part (hereinafter referred to as a new reusable CAD model candidate) selected from the reusable parts recognized in the recognizing process S10 and the CAD model (hereinafter referred to as a registered CAD model) stored in the reusable model storing device 106 (S22). In the present embodiment, it is determined whether one of two CAD models duplicates with the other by comparison. Note that, the process of determining the relation is realized using a 3D CAD model disclosed in, for example, a related document "Antoine Briere-Cote, Louis Rivest and Roland Maranzana, Ecole de technologie superieure de Montreal, "Comparing 3D CAD Models: Uses, Methods, Tools and Perspectives", Computer-Aided Design and Applications, Vol. 9 Num. 6 (2012), pp. 771-794".

Here, if the modeling support system 100 determines that the new reusable CAD model candidate duplicates with any of the registered CAD models (S22: duplication), the process proceeds to step S23, and if determining not to duplicate (S22: no duplication), the modeling support system 100 stores the new reusable CAD model candidate as a new registration candidate (S26) and stores a combination of the new reusable CAD model candidate and the corresponding mesh model as a registration candidate of the reusable model set. After that, the process proceeds to step S27.

In step S23, the modeling support system 100 compares the quality of a mesh model (first mesh model) corresponding to the new reusable CAD model candidate with the quality of a mesh model (second mesh model) corresponding to the duplicated and registered CAD model.

When the quality of the mesh model corresponding to the registered CAD model is higher than the quality of the mesh model corresponding to the new reusable CAD model candidate (S23: registered state>new state), the process proceeds to step S27. This means the new reusable CAD model candidate is excluded and is not stored as a registration candidate.

When the quality of the mesh model corresponding to the new reusable CAD model candidate is higher than the quality of the mesh model corresponding to the registered CAD model (S23: new state>registered state), the new reusable CAD model candidate is stored as a registration candidate in place of the registered CAD model (S25), and the new reusable CAD model candidate and the corresponding mesh model are stored as registration candidates of the reusable model set. After that, the process proceeds to step S27.

Furthermore, when the quality of the mesh model corresponding to the registered CAD model is equal to the quality of the mesh model corresponding to the new reusable CAD model candidate (S23: new state=registered state), the modeling support system 100 compares the quality of the new reusable CAD model candidate with the quality of the registered CAD model (S24).

When the quality of the new reusable CAD model candidate (first CAD model) is higher than the quality of the registered CAD model (second CAD model) (S24: new state>registered state), the process of step S25 described above is performed. When the quality of the new reusable CAD model candidate is not higher than the quality of the registered CAD model (S24: new state⇐registered state), the process proceeds to step S27. This means the new reusable CAD model candidate is deleted and is not stored as the registration candidate.

In step S27, the modeling support system 100 determines whether the comparison of all the new reusable CAD model candidates with the registered CAD model is completed; when it is determined that the comparison has not been completed (S27: NO), the process returns to step S22 in order to perform comparison of other new reusable CAD model candidates, and when it is determined that the comparison is completed (S27: YES), the process is ended (S28). Here, a specific example of the registration candidate storing process S20 will be described on the basis of one example of a monitor display output to the output device 15.

Figure 6:
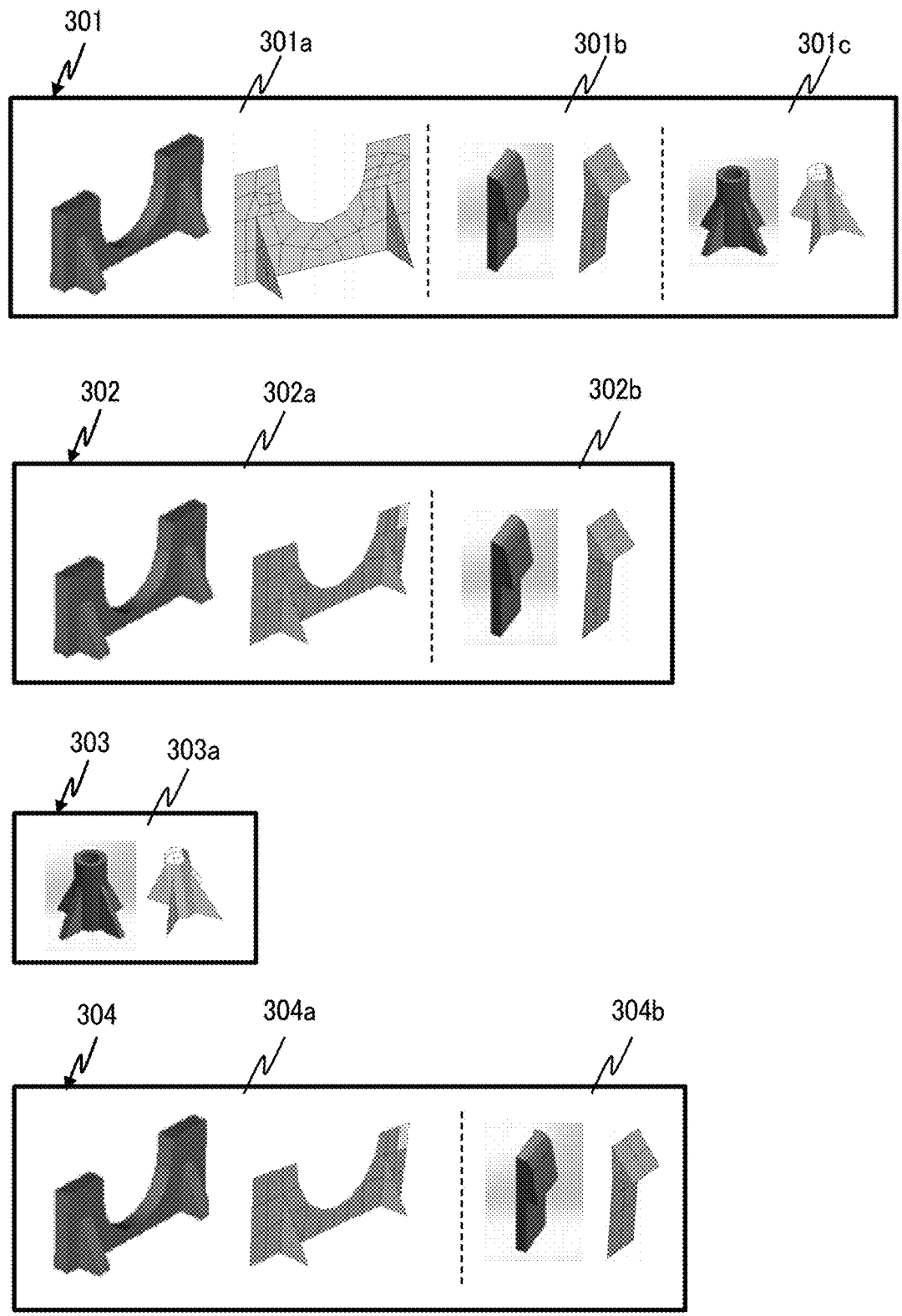
FIG. 6 is a view illustrating an example of a monitor display output to an output device 15 as a result of the registration candidate storing process S20.

FIG. 6 is a view illustrating an example of the monitor display output to the output device 15 by the registration candidate storing process S20. Note that, it is assumed that the modeling support system 100 recognizes, as indicated by reference numeral 301 in FIG. 6, the new reusable CAD model candidate and corresponding mesh model sets 301a, 301b, and 301c, and stores, as indicated by reference numeral 302, the registered CAD model and corresponding reusable mesh model sets 302a and 302b.

First, the modeling support system 100 determines a duplicating relation between a new reusable CAD model candidate in the set 301a and a registered CAD model in the set 302a.

As indicated by reference numeral 302, since the new reusable CAD model candidate in the set 301a duplicates with the registered CAD model in the set 302a, the modeling support system 100 compares the quality of the mesh model in the set 301a with the quality of the mesh model in the set 302a. Specifically, the modeling support system compares the ratio of the triangular elements included in the mesh model of the set 301a with the ratio of the triangular elements included in the CAD model of the set 302a. Then, since the ratio of the triangular elements included in the mesh model of the set 301a is higher than the ratio of the triangular elements included in the CAD model of the set 302a, the modeling support system 100 determines that the quality of the mesh model of the set 302a is higher. Therefore, the new reusable CAD model candidate in the set 301a is excluded from a registration object. In other words, the new reusable CAD model candidate is not stored as a registration object.

Next, the modeling support system 100 determines a duplicating relation between the new reusable CAD model candidate in the set 301b and the registered CAD model in the set 302b.

Here, since the new reusable CAD model candidate of the set 301b duplicates with the registered CAD model of the set 302b, the modeling support system 100 compares the ratio of the triangular elements included in the mesh model of the set 301b with the ratio of the triangular elements included in the mesh model of the set 302b. Since the ratio of the mesh model in the set 301b is equal to the ratio of the mesh model in the set 302b, the modeling support system 100 compares the quality of the new reusable CAD model candidate in the set 301b with the quality of the registered CAD model in the set 302b. Specifically, the modeling support system compares a shortest edge of the new reusable CAD model candidate in the set 301b with that of the registered CAD model in the set 302b. Then, since the shortest edge of the new reusable CAD model candidate in the set 301b is found longer than the shortest edge of the registered CAD model in the set 302b, the modeling support system 100 determines that the quality of the new reusable CAD model candidate in the set 301b is higher. That is, the modeling support system 100 stores the new reusable CAD model candidate of the set 301b as a registration candidate of a reusable model in place of the registered CAD model in the set 302b. In addition, the modeling support system 100 stores the set 301b as a registration candidate of a reusable model set in place of the set 302b.

In addition, the modeling support system 100 attempts to determine the duplicating relation between a new reusable CAD model candidate of the set 301c and a registered CAD model. Since a CAD model corresponding to the new reusable CAD model candidate of the set 301c does not exist, the modeling support system 100 stores the new reusable CAD model candidate of the set 301c as a registration candidate of a new reusable model. Further, the modeling support system 100 stores the set 301c as a registration candidate of a new reusable model set.

By employing the process described above, as indicated by reference numeral 303, the set 301c is stored as a registration candidate 303a of a new reusable model set. In addition, as indicated by reference numeral 304, the set 301a is not stored (reference numeral 304a) as a registration candidate of the reusable model set, and the set 301b is stored as a registration candidate 304b.

Note that, in the present embodiment, the quality comparison of the mesh model and the quality comparison of the CAD model are respectively performed on the basis of the triangular element and the shortest edge. The quality comparison, however, may be performed using any other evaluation parameter.

In addition, the new reusable CAD model candidate may be stored directly as the registration candidate of the reusable model without performing the duplication determination and the quality comparison as described above.

<Classifying Process S30>

Next, the modeling support system 100 executes a process (hereinafter referred to as a classifying process S30) of classifying the registration candidate of the reusable model stored by the registration candidate storing process S20 (FIG. 3).

Figure 7:
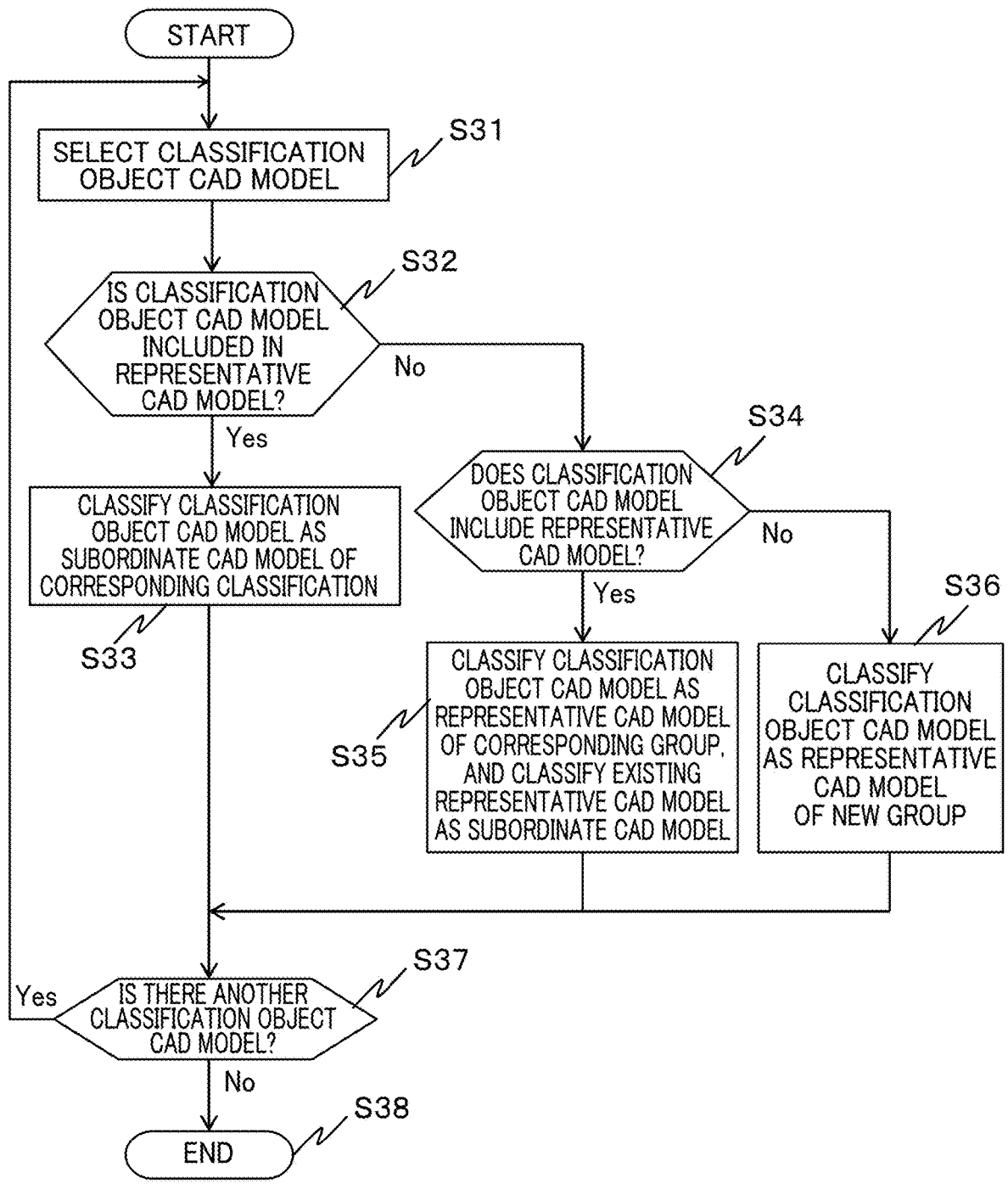
FIG. 7 is a flowchart illustrating a classifying process S30.

FIG. 7 is a flowchart illustrating the classifying process S30.

The modeling support system 100 selects one of the registration candidates of the reusable model (S31), and determines an inclusion relation between the selected registration candidate (hereinafter referred to as a classifying objects CAD model) of the reusable model and the representative CAD model stored in the reusable model storing device 106 (S32). A process of determining the inclusion relation can be realized using algorithms or technologies relating to boundary representation disclosed in, for example, a related document "Hongshen Wang, Lin Zhang and Yonggui Zhang, "Partial Matching of 3D CAD Models with Attribute Graph", Applied Mechanics and Materials, Vol. 528 (2014), pp. 302-309".

The modeling support system 100 determines whether there is any representative CAD model, in the representative CAD models, included in the classifying objects CAD model (S32); when it is determined that there is the representative CAD model included in the classifying objects CAD model (S32: YES), the modeling support system 100 classifies the classifying objects CAD model as a subordinate CAD model belonging to the representative CAD model (S33). After that, the process proceeds to step S27.

When none of the representative CAD models is not included in the classifying objects CAD model (S32: NO), the modeling support system 100 searches to determine whether the classifying objects CAD model includes any of the representative CAD models (S34); when such a representative CAD model can be searched (S34: YES), the modeling support system 100 classifies the classifying objects CAD model as a new representative CAD model in the group to which the representative CAD model belongs, and classifies the existing representative CAD model as a subordinate CAD model belonging to the corresponding group (S35). Note that, the modeling support system 100 classifies the new representative CAD model and the corresponding mesh model as a representative model set, and classifies the existing representative CAD model and the corresponding mesh model as a subordinate model set. After that, the process proceeds to step S37.

When the classifying objects CAD model does not include any representative CAD model (S34: NO), the modeling support system 100 generates a new group, and classifies the classifying objects CAD model as a representative CAD model in the generated group (S36). Note that, the modeling support system 100 classifies the representative CAD model and the corresponding mesh model as a representative model set. After that, the process proceeds to step S37.

In step S37, the modeling support system 100 determines whether other non-selected classifying objects CAD models exist; when the non-selected classifying objects CAD models exist (S37: YES), the process of S31 is repeated for the classifying objects CAD model. When no other non-selected classifying objects CAD models do not exist (S37: NO), the process is terminated (S38).

In this way, the classification according to the representative CAD model representing the group and the subordinate CAD model is performed by the classifying process S30. Then, the representative CAD model and the subordinate CAD model have a common shape. This is also applied to these model sets (representative model set and subordinate model set).

Note that, in the above example, although the correspondence relation between the reusable part and the classification (group) is one-to-many and the correspondence relation between the representative CAD model and the classification (group) is one-to-one, the correspondence relation is not limited to this example.

Next, a specific example of the classifying process S30 will be described below on the basis of one example of a monitor display output to the output device 15.

Figure 8:
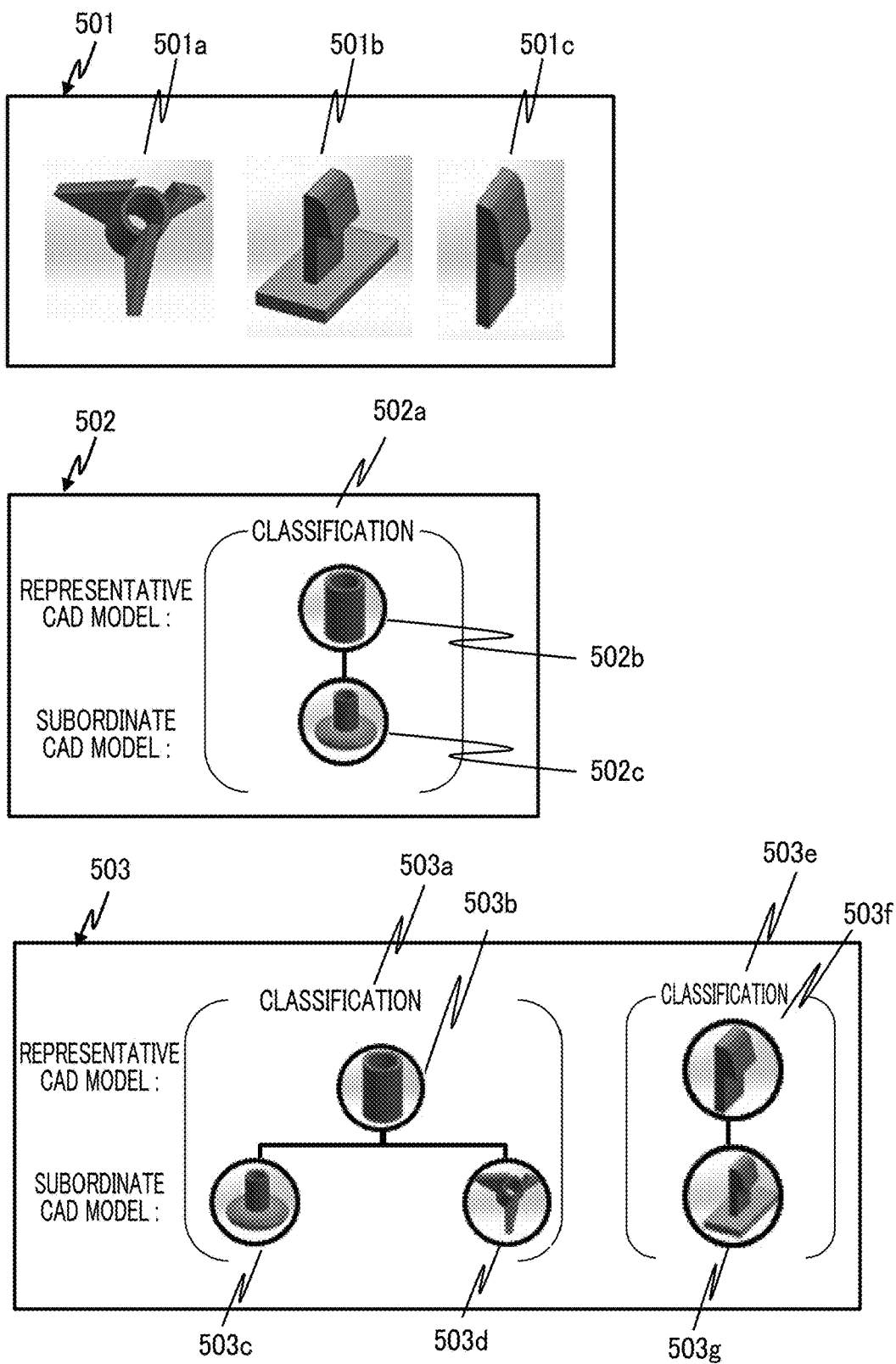
FIG. 8 is a view illustrating an example of a monitor display output to an output device as a result of the classifying process S30.

FIG. 8 is a view illustrating an example of the monitor display output to the output device 15 by the classifying process S30. As indicated by reference numeral 501 in FIG. 8, first, it is assumed that the modeling support system 100 stores classifying objects CAD models 501*a*, 501*b*, and 501*c* as registration candidates. In addition, as indicated by reference numeral 502, it is assumed that the modeling support system 100 classifies the registered reusable model into a group 502*a* including a representative CAD model 502*b* and a subordinate CAD model 502*c* belonging to the representative CAD model 502*b*.

First, the modeling support system 100 determines, in the relation between the classifying objects CAD model 501*a* and the group 502*a*, that the representative CAD model 502*b* is included in the new CAD model 501*a* and classifies the classifying objects CAD model 501*a* into the reusable model (subordinate CAD model) belonging to the representative CAD model 502*b* included in the group 502*a*.

Second, the modeling support system 100 determines, in the relation between the classifying objects CAD model 501*b* and the group 502*a*, that the classifying objects CAD model 501*b* does not include the representative CAD model 502*b* in the group 502*a*, and classifies the classifying objects CAD model 501*b* into a new group and into the representative CAD model in the group.

Third, since the modeling support system 100 determines, in the relation between the classifying objects CAD model 501*c*, the group 502*a*, and the new group, that the representative CAD model 501*c* is included in the representative CAD model (classifying objects CAD model 501*b*) of the new group, the modeling support system 100 classifies the classifying objects CAD model 501*c* into the reusable model (subordinate CAD model) belonging to the representative CAD model (classifying objects CAD model 501*b*) in the new group.

As indicated by reference numeral 503 in FIG. 8, note that a group 503*a* including a representative CAD model 503*b* and subordinate CAD models 503*c* and 503*d* is generated as a result of the classifying process described above. In addition, a new group 503*e* including a representative CAD model 503*f* and a subordinate CAD model 503*g* is generated.

<Mesh Modeling Process S2>

Next, the mesh modeling process S2 will be described below.

The modeling support system 100 executes a process of generating the mesh model (analysis model) corresponding to the CAD model input from the user or the like, that is, the mesh modeling process S2, using the reusable model classified by the classifying process S30 and stored in the reusable model storing device 106.

Figure 9:
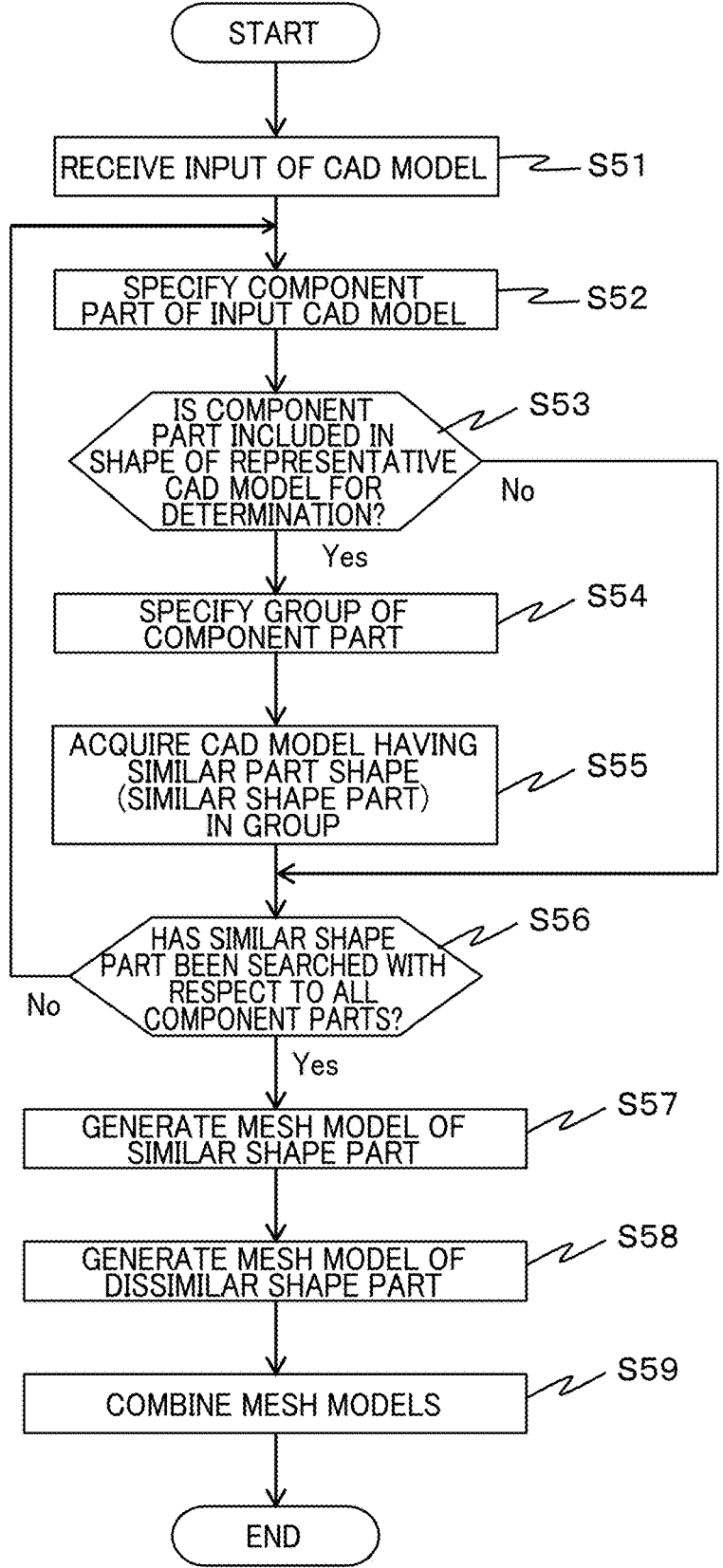
FIG. 9 is a flowchart illustrating a mesh modeling process S2.

FIG. 9 is a flowchart illustrating the mesh modeling process S2. Note that, the mesh modeling process S2 is initiated, for example, when the input device 14 of the modeling support system 100 detects a predetermined input by the user and other operators.

As shown in FIG. 9, first, the modeling support system 100 receives the input of the CAD model from the user or the like through the input device 14 (S51).

The modeling support system 100 specifies each component part of the CAD model (hereinafter referred to as an input CAD model) input in step S51 (S52).

Next, the modeling support system 100 executes a process (hereinafter referred to as a group specifying process) of specifying a group corresponding to the component part specified in step S52 out of the groups classified in the classifying process S30. Specifically, the modeling support system 100 selects one of the component parts specified in step S52, and specifies a representative CAD model, which has a shape including the shape indicated by the selected component part (hereinafter referred to as a component part for determination), out of representative CAD models (hereinafter referred to as representative CAD models for determination) in the groups stored in the classifying process S30 (S53). Note that, the specifying process can be realized using, for example, technologies disclosed in "Hongshen Wang, Lin Zhang and Yonggui Zhang, "Partial Matching of 3D CAD Models with Attribute Graph", Applied Mechanics and Materials, Vol. 528 (2014), pp. 302-309" described above and JP-A-2007-280129.

When the group can be specified (S53: YES), the modeling support system 100 stores information that the component part for determination belongs to the group to which the specified representative CAD model belongs (S54), and the process proceeds to step S55. When the group cannot be specified (S53: NO), the process proceeds to step S56. Here, an example of the group specifying process will be described on the basis of one example of a monitor display output to the output device 15.

Figure 10:
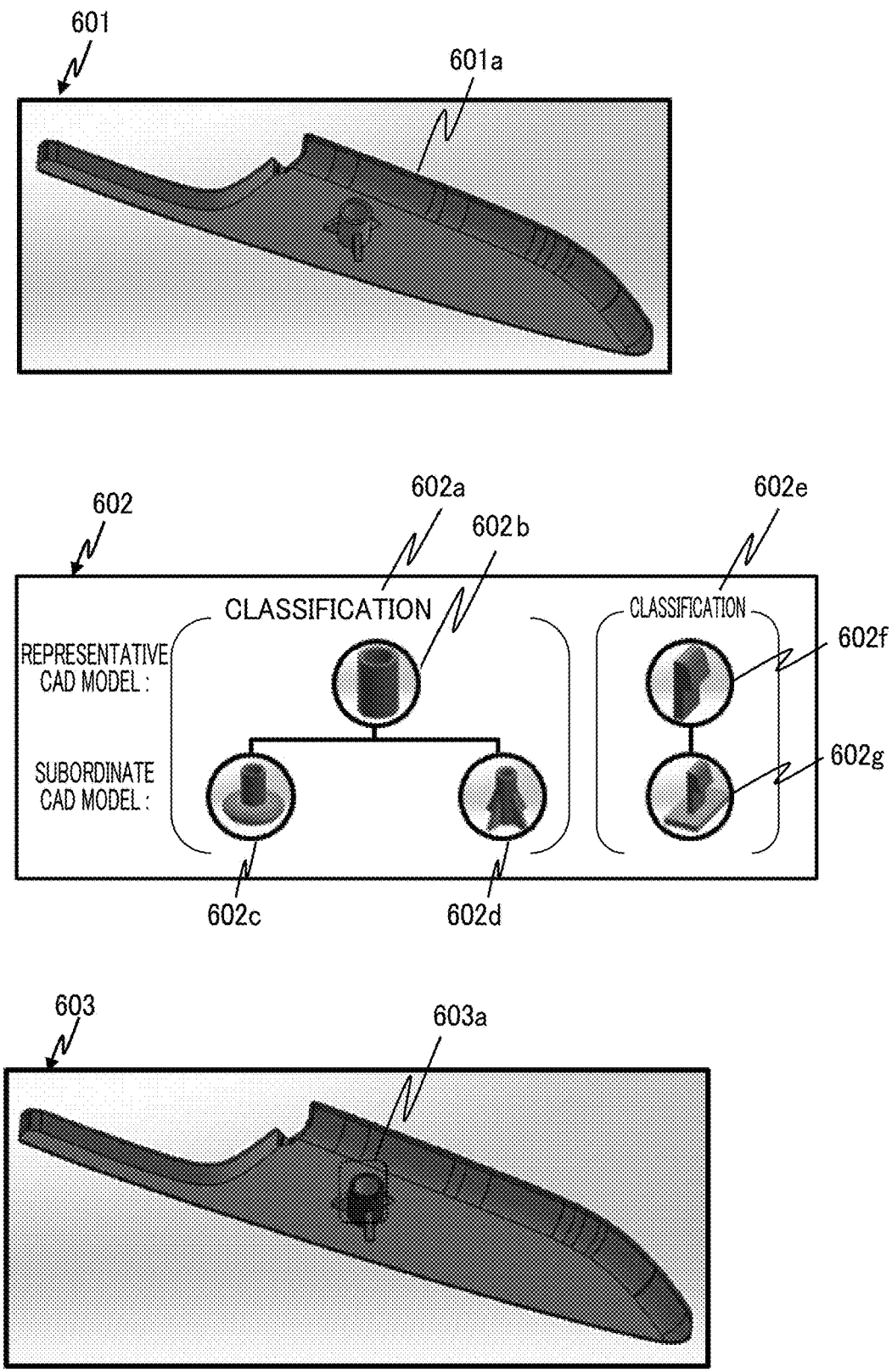
FIG. 10 is a view illustrating an example of a monitor display output to an output device as a result of the group specifying process.

FIG. 10 is a view illustrating an example of a monitor display output to the output device 15 in the group specifying process. As indicated by reference numeral 601 in FIG. 10, when input CAD model 601*a* is input, the modeling support system 100 determines an inclusion relation between an input CAD model 601*a*, a representative CAD model for determination 602*b* in a group 602*a* indicated by reference numeral 602, and a representative CAD model for determination 602*f* in a group 602*b*. Note that, it is assumed that reusable models 602*c* and 602*d* belong to the representative CAD model for determination 602*b* and a reusable model 602*g* belongs to the representative CAD model for determination 602*f*.

Here, the modeling support system 100 determines that a component part 603*a* in the input CAD model 601*a* includes the representative CAD model for determination 602*b* in the group 602*a*. As a result, as indicated by reference numeral 603, the modeling support system 100 specifies that the component part 603*a* including the component part 603*a* is included in the group 602*a*.

In step S55, the modeling support system 100 executes a process (hereinafter referred to as a similar-shape-part searching process S55) of searching and obtaining a CAD model part (hereinafter referred to as a similar shape part) having a shape most similar to the shape of the component part for determination, from the CAD models in the group to which the representative CAD model specified in S54 belongs. Note that, the above process can be realized using, for example, the technologies disclosed in "Hongshen Wang, Lin Zhang and Yonggui Zhang, "Partial Matching of 3D CAD Models with Attribute Graph", Applied Mechanics and Materials, Vol. 528 (2014), pp. 302-309" and JP-A-2007-280129 described above. Here, a specific example of the similar-shape-part searching process S55 will be described on the basis of one example of a monitor display output to the output device 15.

Figure 11:
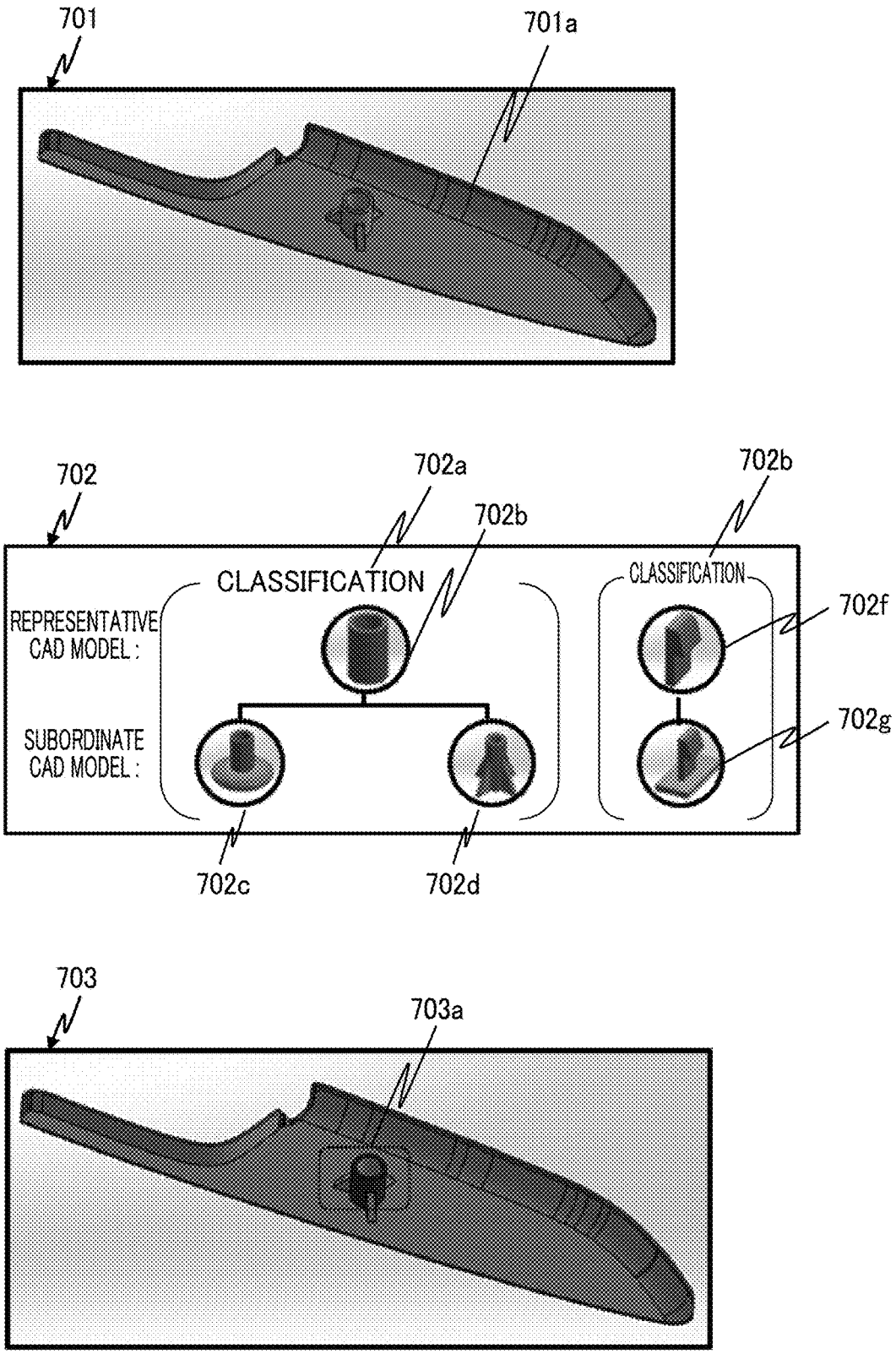
FIG. 11 is a view illustrating an example of a monitor display output to an output device as a result of a similar-shape-part searching process S55.

FIG. 11 is a view illustrating an example of a monitor display output to the output device 15 in the similar-shape-part searching process S55. As indicated by reference numeral 701 in FIG. 11, the modeling support system 100 determines an inclusion relation between an input CAD model 701a, and a representative CAD model for determination 702b in a group 702a indicated by reference numeral 702, and a representative CAD model for determination 702f in a group 702b. Note that, it is assumed that reusable models 702c and 702d are subordinate CAD models belonging to the representative CAD model for determination 702b, and a reusable model 702g is a subordinate CAD model belonging to the representative CAD model for determination 702f.

As indicated by reference numeral 703, the modeling support system 100 determines that a component part 703a in the input CAD model 701a includes the representative CAD model for determination 702b in the group 702a and the input CAD model 701a including the component part 703a belongs to the group 702a. Then, the modeling support system 100 determines that the component part 703a is most similar to the reusable CAD model 702d belonging to the representative CAD model for determination 702a, out of the reusable CAD models in the group 702a.

The modeling support system 100 determines whether the similar shape part has been searched with respect to all the component parts (S56); when it is determined that the similar shape part has been searched with respect to all the component parts (S56: YES), the process proceeds to step S57. When it is determined that there are similar shape parts which have been searched (S56: NO), the process returns to step S52 so as to search the similar shape part with respect to the component part.

In step S57, the modeling support system 100 executes a process (hereinafter referred to as a similar-shape-part mesh modeling process S57) of generating a mesh model corresponding to the CAD model on the basis of the CAD model of the similar shape part searched and obtained in step S55. Specifically, the modeling support system. 100 generates the mesh model by changing a mesh size of the mesh model corresponding to the CAD model of the similar shape part or tailoring such as addition or deletion of the mesh and movement of the node. The above modeling is carried out by obtaining geometric features and geometric values of the model as disclosed in JP-A-2006-301753, for example. Here, a specific example of the similar-shape-part mesh modeling process S57 will be described on the basis of one example of a monitor display output to the output device 15.

Figure 12:
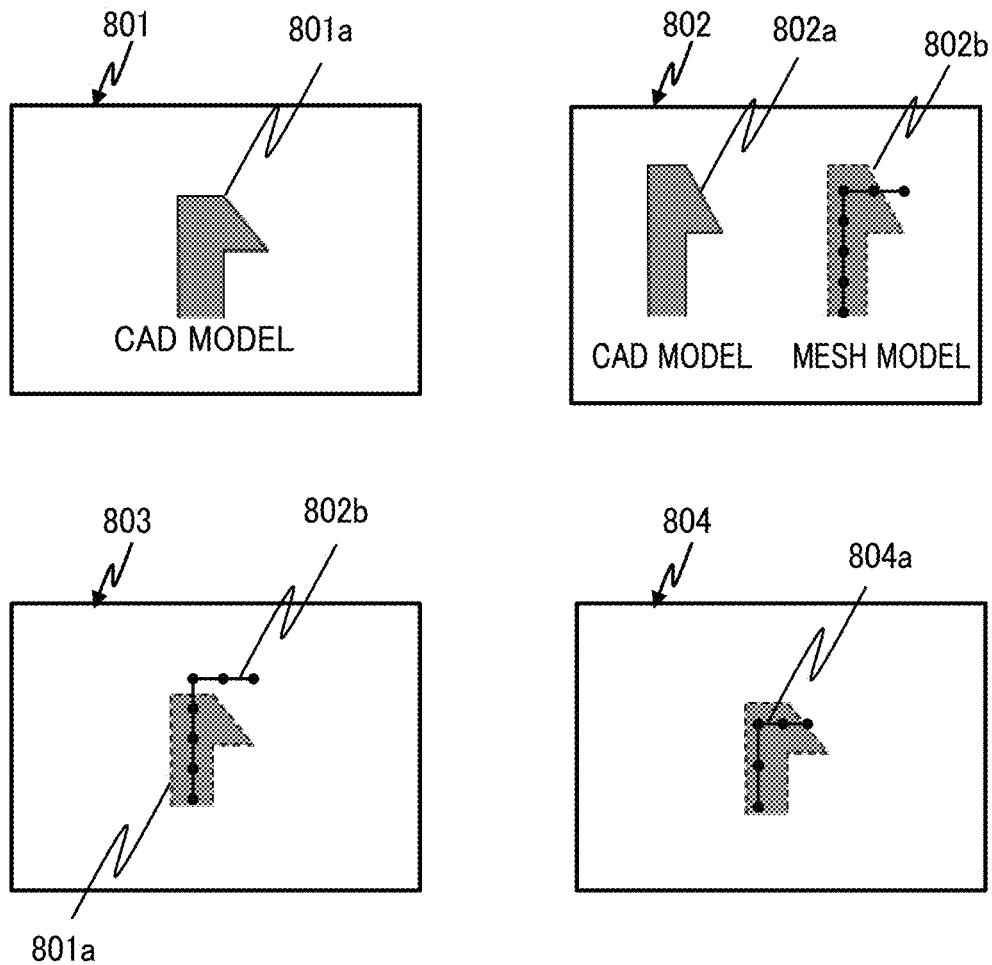
FIG. 12 is a view illustrating an example of a monitor display output to an output device as a result of a similar-shape-part mesh modeling process S57.

FIG. 12 is a view illustrating an example of a monitor display output to the output device 15 in the similar-shape-part mesh modeling process S57. As indicated by reference numeral 801 in FIG. 12, it is assumed that the modeling support system 100 specifies a component part 801a in the input CAD model. In addition, as indicated by reference numeral 802, it is assumed that the modeling support system 100 searches and obtains a CAD model 802a of the similar shape part and a mesh model 802b corresponding to the CAD model 801a.

As indicated by reference numeral 803, there is a difference between a shape indicated by the component part 801a and a shape indicated by the mesh model 802b. Therefore, as indicated by reference numeral 804, the modeling support system 100 edits the mesh model 802b and generates a modified mesh model 804a as indicated by reference numeral 804.

Next, the modeling support system 100 executes a process (hereinafter referred to as a dissimilar-part mesh modeling process S58) of modeling a mesh model corresponding to a component part (hereinafter referred to as a dissimilar shape part) of the input CAD model which has not searched in the similar-shape-part searching process S55 (S58). Specifically, the modeling support system 100 executes the following process, for example.

First, the modeling support system 100 deletes the similar-shape-part CAD model from the input CAD model. Then, since the input CAD model after deletion has a partial shape having a hole, the modeling support system 100 performs a process of filling the hole. The above process can be realized using a technology for making a hole-filling surface using CAE (Computer Aided Engineering) as disclosed in a related document "Tanimoto, Nakamura, and Takei, "Development of making function of hole-filling surface using CAE simulation", proceedings of Japan Society for Precision Engineering Semestrial Meeting, 2010(0), pp. 133-134", for example.

Then, the modeling support system 100 generates a mesh model corresponding to the input CAD model in which the hole is filled. The process of modeling the mesh model can be realized using a technology for generating a quadrilateral element disclosed in JP-A-8-138082, for example.

Next, the modeling support system 100 executes a process (hereinafter referred to as a mesh model combining process S59) of generating a mesh model as a modeling object corresponding to the input CAD model by combining the mesh model generated in the similar-shape-part mesh modeling process S57 and the mesh model generated in the dissimilar-part mesh modeling process S58 (S59).

Specifically, for example, the modeling support system 100 generates a mesh model as a modeling object by making a position of the mesh model generated in the similar-shape-part mesh modeling process S57 correspond to a position of the mesh model generated in the dissimilar-part mesh modeling process S58 (for example, change in a mesh size, deletion of mesh, and movement of point). Here, a specific example of the mesh model combining process S59 will be described on the basis of one example of a monitor display output to the output device 15.

Figure 13:
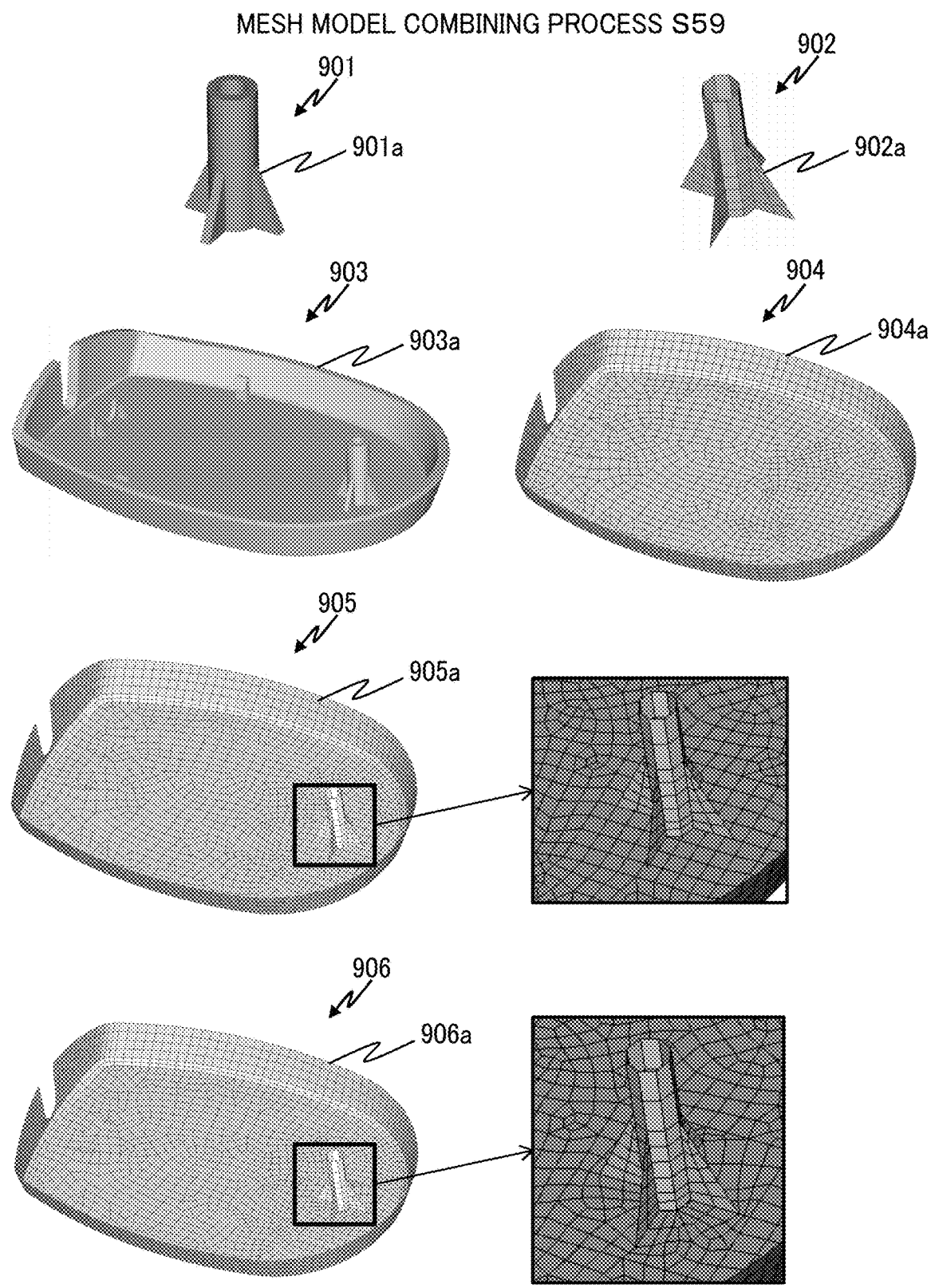
FIG. 13 is a view illustrating an example of a monitor display output to an output device as a result of a mesh model combining process S59.

FIG. 13 is a view illustrating an example of a monitor display output to the output device 15 by the mesh model combining process S59. As indicated by reference numeral 901 in FIG. 13, the modeling support system 100 searches a similar shape part 901a, and obtains a mesh model 902a corresponding to the similar shape part 901a (reference numeral 902). As indicated by reference numeral 903, the modeling support system 100 specifies a dissimilar shape part 903a, and obtains a mesh model 904a corresponding to the dissimilar shape part 903a (reference numeral 904).

(a) Then, the modeling support system. 100 generates a mesh model 905a in which a position of the mesh model 904a and a position of the mesh model 902a are adjusted (reference numeral 905).

(b) Then, the modeling support system 100 combines the similar shape part and the dissimilar shape part in the generated mesh model 905a. As a method for combining, for example, an intersecting element is extracted with respect to the similar shape part and the dissimilar shape part, and the element is divided at the intersecting portion. There is a method for the above process repeating for all the intersecting elements. There is also a method of moving a node so that the node in the dissimilar shape part becomes the same coordinate as the node in the similar shape part. These methods can be combined and used to combine the meshes.

Finally, as indicated by reference numeral 906, the modeling support system 100 improves elements of the mesh model 905a whose quality is deteriorated due to the combining or the like (for example, converting a triangular element included in the mesh model 905a into a quadrilateral element), and generates a mesh model 906a. That is, the above-described procedures (a) and (b) are repeatedly executed on the mesh model 905a. Note that this process can be realized using a technology for modifying a mesh on the basis of the quality evaluation of the mesh as disclosed in JP-A-2008-107960, for example.

<Example of the Overall Process>

Finally, an example of the overall process flow in the modeling support system 100 will be described. First, the reusable model recognizing/classifying process S1 (FIG. 2) will be described on the basis of one example of the monitor display output to the output device 15.

Figure 14:
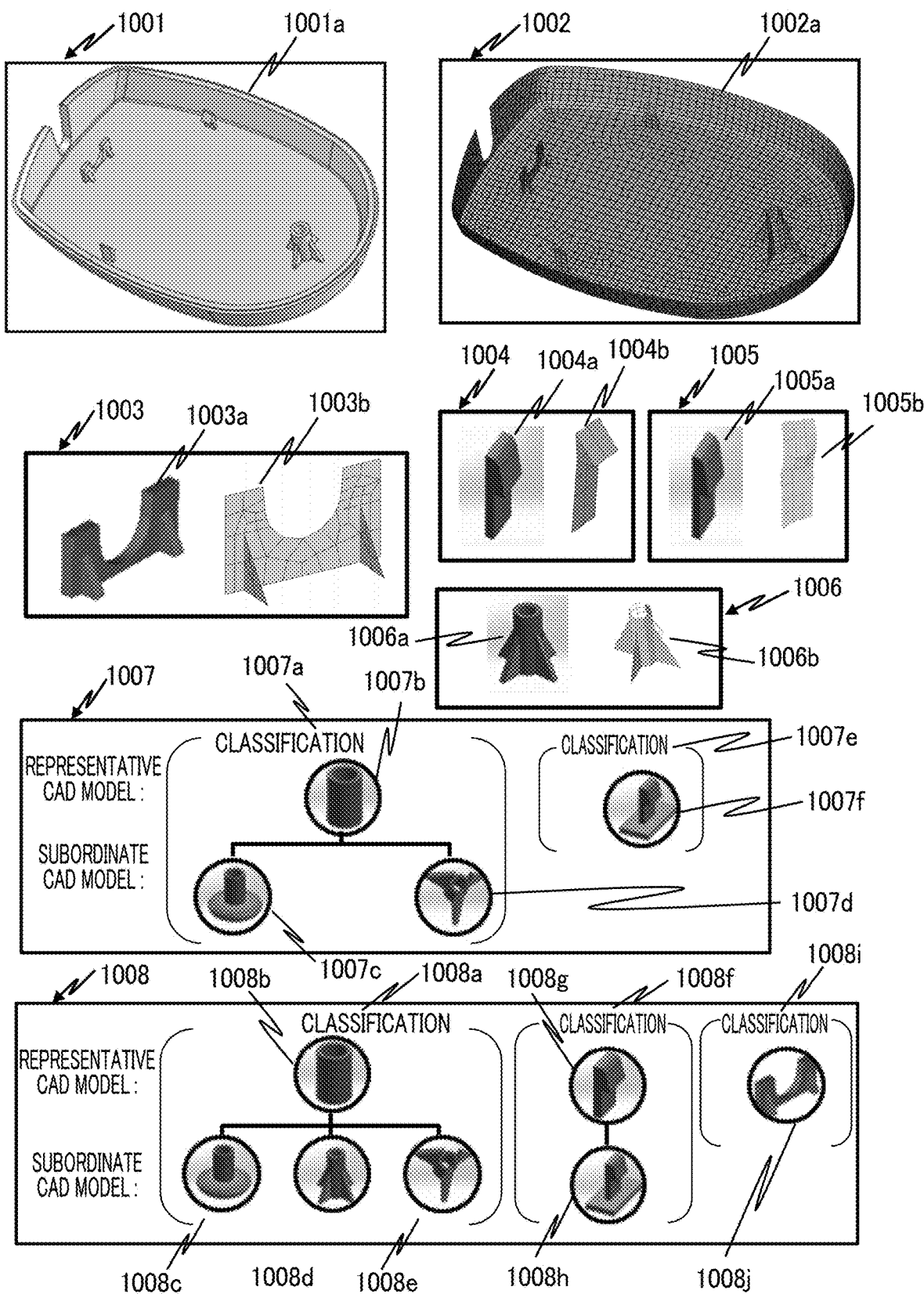
FIG. 14 is a view illustrating an example of a monitor display output to an output device as a result of the reusable model recognizing/classifying process S1.

FIG. 14 is a view illustrating an example of the monitor display output to the output device 15 by the reusable model recognizing/classifying process S1. As indicated by reference numerals 1001 and 1002 in FIG. 14, first, the model storing unit 120 receives and stores an input of a CAD model 1001a and a mesh model 1002a corresponding to the CAD model 1001a.

(1) Second, the reusable model recognizing unit 103 recognizes a partial shape of a CAD model, which is reusable in modeling a new mesh model, with respect to the stored CAD model 1001a and mesh model 1002a. As a result, as indicated by reference numeral 1003, a CAD model 1003a is stored as a registration candidate of a reusable model, and a set including the CAD model 1003a and a mesh model 1003b is stored as a registration candidate of a reusable model set. After that, as indicated by reference numeral 1004, a CAD model 1004a is stored as a registration candidate of a reusable model, and a set including the CAD model 1004a and a mesh model 1004b is stored as a registration candidate of a reusable model. Further, as indicated by reference numeral 1005, a CAD model 1005a is stored as a registration candidate of a reusable model, and a set including the CAD model 1005a and a mesh model 1005b is stored as a registration candidate of a reusable model set. In addition, as indicated by reference numeral 1006, a CAD model 1006a is stored as a registration candidate of a reusable model, and a set including the CAD model 1006a and a mesh model 1006b is stored as a registration candidate of a reusable model set.

(2) The duplicated reusable model deleting unit 104 deletes duplication between the CAD models 1003a, 1004a, 1005a, and 1006a of the above-described (1) and the CAD model stored in the reusable model storing device 106 indicated by reference numeral 1007. As indicated by reference numerals 1004 and 1005, the duplicated reusable model deleting unit 104 determines that the CAD model 1004a and the CAD model 1005a are duplicated and determines that the quality of the mesh model 1004b is higher than the quality of the mesh model 1005b, thereby deleting the CAD model 1005a and the set of the CAD model 1005a and the mesh model 1005b from the registration candidate.

In this way, when the CAD models (or sets) of the registration candidates are duplicated, one of them may be deleted from the registration candidates.

(3) While performing such a duplicate deleting process, the reusable model classifying unit 105 sequentially classifies the CAD models of the registration candidates on the basis of the CAD model stored in the reusable model storing device 106 and performs a process of registering it in the reusable model storing device 106. The state of the reusable model storing device 106 after registration is indicated by reference numeral 1008. For example, a group 1008a is a group including a representative CAD model 1008b and reusable CAD models 1008c, 1008d, and 1008e which are subordinate CAD models subordinate to the representative CAD model 1008b. A group 1008f is a group including a representative CAD model 1008g and a reusable CAD model 1008h which is a subordinate CAD model subordinate to the representative CAD model 1008g. A group 1008i is a group including a representative CAD model 1008j. The above is a specific example of the process of the reusable model recognizing/classifying process S1.

Second, a specific example of the mesh modeling process S2 (FIG. 3) will be described on the basis of one example of the monitor display output to the output device 15.

Figure 15:
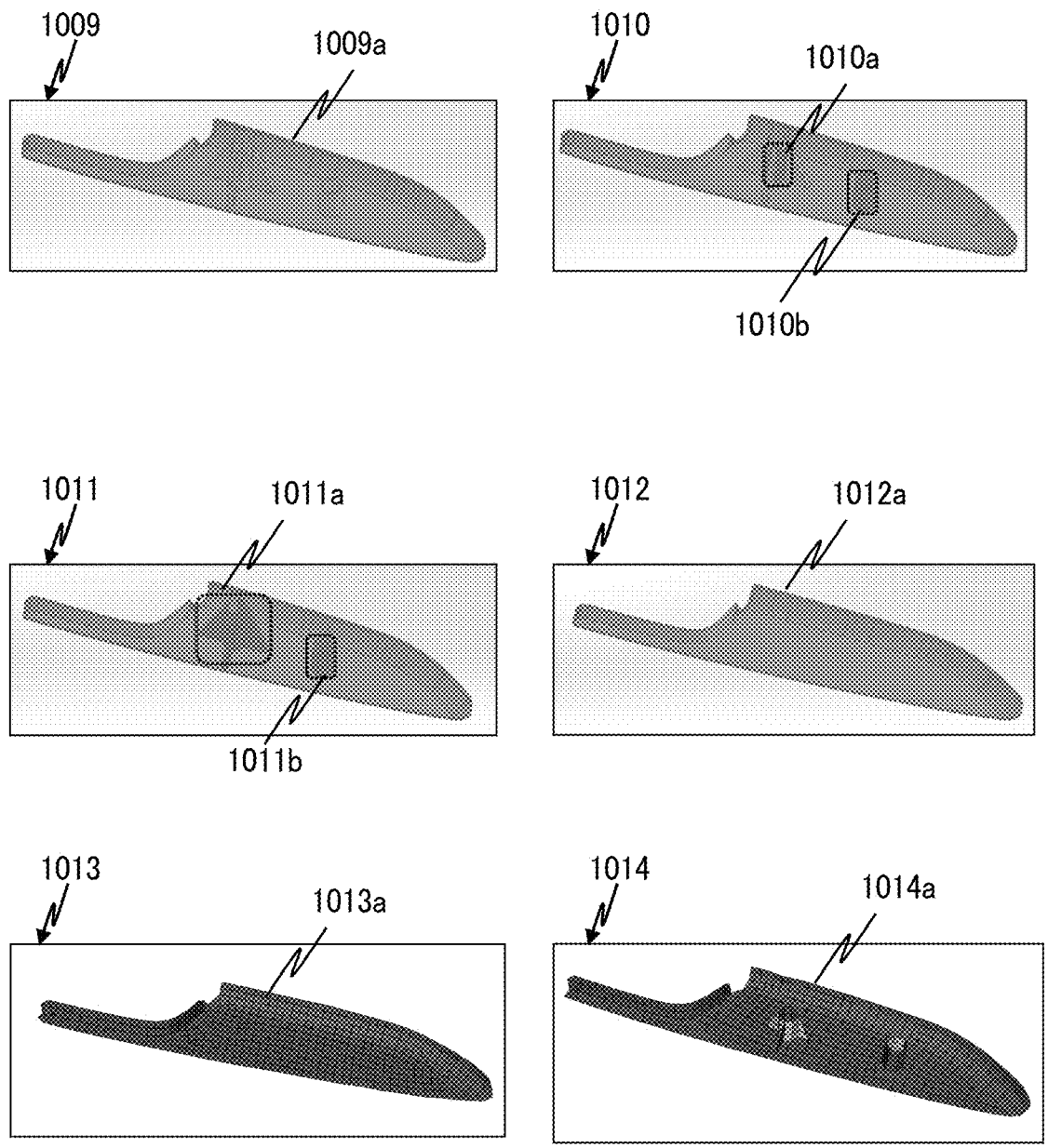
FIG. 15 is a view illustrating an example of a monitor display output to an output device as a result of the mesh modeling process S2.

FIG. 15 is a view illustrating an example of the monitor display output to the output device 15 by the mesh modeling process S2. As indicated by reference numeral 1009 in FIG. 15, the CAD data registering unit 101 receives an input of an input CAD model 1009a from the user and other operators.

(3) The search classification specifying unit 107 searches a similar partial shape from the component part of the input CAD model 1009a, on the basis of representative reusable CAD models (a representative CAD model 1008b, a representative CAD model 1008g, and a representative CAD model 1008j in FIG. 14) stored in the reusable model storing device 106. Here, as indicated by reference numeral 1010, since partial shapes 1010a and 1010b similar to the representative CAD model 1008b are searched from the input CAD model 1009a, the classification is performed that a group to which the input CAD model 1009a including the partial shapes 1010a and 1010b belongs is the group 1008a to which the representative CAD model 1008b belongs.

(4) The similar-shape-part search unit 108 searches a partial shape similar to the component part of the input CAD model 1009a, on the basis of the above-described (3) and the reusable CAD models 1008b to 1008e in the group 1008a.

In the above search, the reusable CAD models in the groups 1008f and 1008i are excluded from the search due to the classification according to the above-described (3).

For this reason, it is possible to reduce the number of executions of the searching process. This is one of the unique effects of the modeling support system 100 according to the present embodiment.

As a result of this search, as indicated by reference numeral 1011, a partial shape 1011a similar to the reusable model 1008d and a partial shape 1011b having a shape similar to that of the reusable model 1008a are searched. These partial shapes 1011a and 1011b are separated from the input CAD model 1009a. By performing such a separation, as indicated by reference numeral 1012, a dissimilar part 1012a in the input CAD model 1009a is specified.

(5) Next, the dissimilar-part mesh modeling unit 110 generates a mesh model corresponding to the dissimilar part 1012a. Thus, a mesh model 1013a is generated as indicated by reference numeral 1013.

(6) Next, since the reusable CAD model 1008d is similar to the partial shape 1011a, the similar-part mesh modeling unit 109 uses the mesh model corresponding to the reusable CAD model 1008d again to generates a mesh model 1011a corresponding to the partial shape 1011a. In addition, since the reusable CAD model 1008a is similar to the partial shape 1011b, the similar-part mesh modeling unit 109 uses the mesh model corresponding to the reusable CAD model 1008a again to generates a mesh model corresponding to the partial shape 1011b.

(7) Then, the mesh combining unit 111 combines the mesh model corresponding to the dissimilar part 1012a generated in the above-described (5) and the mesh model corresponding to the partial shape 1011*a* and the mesh model corresponding to the partial shape 1011*b* modeled in the above-described (6), thereby generating a mesh model 1014*a* as indicated by reference numeral 1014. The mesh model 1014*a* is a modeling object mesh model generated on the basis of the input CAD model 1009*a*.

In this way, the reusable model set is used again, and thus the mesh model satisfying predetermined specifications can be generated efficiently.

As described above, the modeling support system 100 of the present embodiment classifies each of the parts of the CAD model into one of a plurality of groups on the basis of the shape of the CAD model, specifies the group corresponding to the component part of the input CAD model out of the classified groups, searches and obtains the part of the CAD model having the shape most similar to the shape indicated by the component part in the group, and generates a new mesh model corresponding to the input CAD model using the obtains mesh model. That is, the group search related to the component part of the input CAD model is performed on the basis of the CAD model stored in advance to obtain necessary mesh model parts, and thus the modeling object mesh model is generated by combination of these obtains mesh model parts.

When the model is used again by the group search, the mesh model of a modeling object can be generated efficiently and quickly.

Further, the modeling support system 100 of the present embodiment recognizes the shapes of the respective CAD model parts and sets the part of the CAD model having shapes similar to each other to the same group, whereby the respective stored parts of the CAD model are classified into one of the plurality of groups, the criterion of classification is clear, and accurate classification according to the property of the CAD model specifying the shape of the structure or product can be performed. Thus, the mesh model of a modeling object can be generated efficiently and quickly.

Furthermore, the modeling support system 100 of the present embodiment classifies the respective parts of the CAD model classified into the group into the part of the CAD model representing the group and part of the other CAD model belonging to part of the representative CAD model step by step, and thus it is possible to search the group related to the CAD model efficiently. Thus, the mesh model of a modeling object can be generated efficiently and quickly.

Further, since the modeling support system 100 of the present embodiment specifies the shape of the component part of the input CAD model and specifies the group out of the specified groups to which the CAD model including the specified shape belongs as the group corresponding the specified component part, it is possible to specify the group to which the respective component parts of the input CAD model belong according to the its shape. Thus, the mesh model of a modeling object can be generated efficiently and quickly.

Furthermore, when the part of the CAD model having the most similar shape cannot be obtained, the modeling support system 100 of the present embodiment generates the mesh model corresponding to the component part of the input CAD model and generates a new model using the generated mesh model, and thus it is possible to reliably generate the mesh model of a modeling object even when the input CAD model has any shape, for example, even when the input CAD model is complicated or indicates a special shape.

Further, since the modeling support system 100 of the present embodiment determines whether the respective CAD models satisfying a predetermined relation exist at the time of classification, and classifies only one part of the CAD model of the respective parts of the CAD model satisfying the predetermined relation into one of the plurality of groups, that is, performs the duplicate deleting process, the number of CAD models referred to at the time of group search can be minimized, and thus the mesh model of a modeling object can be generated efficiently and quickly.

Furthermore, when determining that the quality of the first part of the CAD model (new reusable CAD model candidate) is higher than the quality of the second part of the CAD model (registered CAD model) or that the quality of the mesh model corresponding to the first part of the CAD model is higher than the quality of the mesh model corresponding to the second part of the CAD model, since the modeling support system 100 of the present embodiment performs the duplicate deleting process of classifying the first CAD model part into one of the plurality of groups on the basis of the model quality, it is possible to generates the mesh model corresponding to the input CAD model on the basis of the high-quality CAD model or mesh model and to generate a high-quality mesh model of a modeling object efficiently and quickly.

In addition, since the modeling support system 100 of the present embodiment outputs the classified part of the CAD model (reusable part) and the new mesh model (modeling object mesh model) generated using such apart of the CAD model to the output device 15, the user or the like can easily confirm how to reuse the classified CAD model (reusable model) to generate the model of a modeling object.

Although the present embodiment of the present invention has been particularly described, the invention is not limited thereto, and various modifications can be made without departing from the scope of the invention.

For example, the process of specifying and classifying the inclusion relation described in the present embodiment is merely an example. In the present embodiment, the process of specifying and classifying the inclusion relation is performed on the basis of shapes indicated by the respective CAD models. The inclusion relation, however, may be specified and classified on the basis of functions installed in the members having the shapes of the respective CAD models, for example, or the inclusion relation with multiple hierarchies may be specified or classified.

In the present embodiment, the duplication determination or the quality comparison of the parts of the CAD model is performed in the registration candidate storing process S20 before the new reusable CAD model candidate is stored in the reusable model storing device 106 (or before being classified into the group). However, after the new reusable CAD model candidate is stored in the reusable model storing device 106, one of the stored new reusable CAD model candidate and the registered CAD model stored in advance may be deleted by comparison.

In the present embodiment, the modeling support system 100 automatically performs comparison on the basis of a predetermined relation (duplication determination or quality comparison of the parts of the CAD model) in the registration candidate storing process S20. However, the user directly receives the input of the relation and the respective parts of the CAD model selected according to contents of the received relation may be classified into one of the plurality of groups. For example, the user may directly select a model with higher quality. Thus, the types of CAD models desired by the user can be classified, and thus a desired type of mesh model can be generated.

REFERENCE SIGNS LIST

100 Molding support system
101 CAD data registering unit
102 Mesh data registering unit
103 Reusable model recognizing unit
104 Duplicated reusable model deleting unit
105 Reusable model classifying unit
106 Reusable model storing device
107 Search classification specifying unit
108 Similar-shape-part search unit
109 Similar-part mesh modeling unit
110 Dissimilar-part mesh modeling unit
111 Mesh combining unit
112 CAD model output unit
120 Model storing unit
130 Mesh model generating unit
S1 Reusable model recognizing/classifying process
S10 Recognizing process
S20 Registration candidate storing process
S30 Classifying process
S2 Mesh modeling process
S55 Similar-shape-part searching process
S57 Similar-shape-part mesh modeling process
S59 Mesh model combining process

What is claimed is:

1. A modeling support system comprising:
a processor;
a display coupled to the processor; and
a memory coupled the processor, the memory storing instructions that when executed by the processor configure the processor to:
store combinations of first Computer Aided Design (CAD) models and corresponding first mesh models, the first CAD models respectively indicating shapes of a tangible object,
recognize a plurality of shapes of parts of the tangible object respectively indicated by the first CAD models,
classify each of the parts of the stored first CAD models into one of a plurality of first groups based on the recognized shapes, each first group having at least two of the parts,
display, on the display via a CAD interface, each of the at least two of the parts of the plurality of first groups,
receive an input of a CAD model,
specify component parts of the input CAD model, and specify respective groups corresponding to the specified component parts of the input CAD model from among the specified first groups of the parts from the first CAD models,
display, on the display via the CAD interface, the specified component parts of the input CAD model and the input CAD model,
search and obtain a part of the first CAD models having a shape determined to be most similar to the shape indicated by the specified component part of the input CAD model, from among the parts of the first CAD models in the specified first groups and obtain a second CAD model based on the obtained part of the first CAD models,
obtain a mesh model corresponding to the obtained second CAD model, from among the stored first mesh models, and generate a new mesh model corresponding to the input CAD model using the obtained mesh model,
output the classified CAD model part and the new mesh model generated using the obtained part of the second CAD model, and
display, on the display via the CAD interface, the generated new mesh model.

2. The modeling support system according to claim 1, wherein the processor is configured to recognize shapes of the parts of the stored first CAD models and set the parts of the first CAD models determined to have a shape similar to each other to the same group, thereby classifying the stored parts of the CAD model into one of the plurality of groups.

3. The modeling support system according to claim 1, wherein the processor is configured to classify the parts of the first CAD models classified into the group into a third CAD model representing the group and the other parts of the first CAD models belonging to the representative part of the first CAD models.

4. The modeling support system according to claim 1, wherein the processor is configured to specify the shape of the component part of the input CAD model, and further specify the group to which the first CAD models including the specified shape belongs as a group corresponding to the specified component part among the classified groups.

5. The modeling support system according to claim 1, wherein the mesh model is a first mesh model,
wherein the processor is configured to generate a second mesh model corresponding to the specified component part when the parts of the first CAD models indicating the most similar shape are not obtained, and
generate the new mesh model using the generated second mesh model and the obtained first mesh model.

6. The modeling support system according to claim 1, wherein the processor is configured to determine whether the plurality of parts of the first CAD models satisfy a predetermined relation and classify only the CAD model part selected from the plurality of parts of the first CAD models into one of the plurality of groups upon classifying the parts of the first CAD models.

7. The modeling support system according to claim 6, wherein the processor is configured to when determining that a quality of a first part of the first CAD model is higher than that of a second part of the first CAD models or a quality of a mesh model corresponding to the first part of the first CAD models is higher than that of a mesh model corresponding to the second part of the second CAD model, select the first part of the first CAD models and classifies the first part of the first CAD models into one of the plurality of groups.

8. The modeling support system according to claim 6, wherein the processor is configured to receive an input of the relation from a user and classifies the selected part of the first CAD models into one of the plurality of groups according to contents of the received relation.

9. The modeling support system according to claim 1, wherein the mesh model is a first mesh model,
wherein the processor is configured to: generate a second mesh model corresponding to the specified component part when the parts of the first CAD models indicating the most similar shape are not obtained,
determine whether the plurality of parts of the first CAD models satisfy a predetermined relation exist and classifies only the part of the CAD model selected from the plurality of parts of the first CAD models into one of the plurality of groups when the parts of the first CAD models are classified, recognize shapes of the parts of the stored first CAD models and set the parts of the first CAD models determined to have a shape similar to each other to the same group, thereby classifying the stored parts of the CAD model into one of the plurality of groups, classify the parts of the first CAD models classified into the group into a third CAD model representing the group and the other parts of the first CAD models belonging to the representative part of the first CAD models, specify the shape of the component part of the input CAD model, and further specify the group to which the first CAD models including the specified shape belongs as a group corresponding to the specified component part among the classified groups, generate the new mesh model using the generated second mesh model and the obtained first mesh model, upon determining that a quality of a first part of the first CAD model is higher than that of a second part of the first CAD models or a quality of a mesh model corresponding to the first part of the first CAD models is higher than that of a mesh model corresponding to the second part of the second CAD model, select the first part of the first CAD models and classify the first part of the first CAD models into one of the plurality of groups, and receive an input of the relation from a user and classify the selected part of the first CAD models into one of the plurality of groups according to contents of the received relation.

10. A modeling support method to be performed by an information processing device including a processor for executing a program, a display coupled to the processor, and a memory, the method comprising:

storing combinations of a first CAD models and corresponding first mesh models, the first CAD models respectively indicating shapes of a tangible object;

recognizing a plurality of shapes of parts of a tangible object respectively indicated by the first CAD models;

classifying respective each of the parts of the stored first CAD models into one of a plurality of first groups based on the recognized shapes, each first group having at least two of the parts;

displaying, on the display via a CAD interface, each of the at least two of the parts of the plurality of first groups;

receiving an input of a CAD model, specifying component parts of the input CAD model, and further specifies respective groups corresponding to the specified component parts of the input CAD model from among the specified first groups of the parts from the first CAD models;

displaying, on the display via the CAD interface, the specified component parts of the input CAD model and the input CAD model;

searching and obtaining a part of the first CAD models having a shape determined to be most similar to the shape indicated by the specified component part of the input CAD model, from among the parts of the first CAD models in the specified first groups and obtains a second CAD model based on the obtained part of the first CAD models;

obtaining a mesh model corresponding to the obtained second CAD model, from among the stored first mesh models, and generating a new mesh model corresponding to the input CAD model using the obtained mesh model;

outputting the classified CAD model part and the new mesh model generated using the obtained part of the second CAD model; and displaying, on the display via the CAD interface, the generated new mesh model.

11. The modeling support method according to claim 10, wherein the mesh model is a first mesh model, wherein the information processing device further performs:

generating a second mesh model corresponding to the specified component part when the part of the first CAD models indicating the most similar shape is not obtained;

determining whether the plurality of parts of the first CAD models satisfying a predetermined relation exist and classifying only the part of the CAD model selected from the plurality of parts of the first CAD models into one of the plurality of groups when the parts of the first CAD models are classified;

recognizing shapes of the stored parts of the first CAD model parts and setting the parts of the first CAD models determined to have a shape similar to each other to the same group, thereby classifying the stored parts of the CAD model into one of the plurality of groups;

classifying the CAD model parts classified into the group into the part of the first CAD models representing the group and the other parts of the first CAD models belonging to the representative part of the first CAD models;

specifying the shape of the component part of the input CAD model, and specifying the group to which the first CAD models including the specified shape belongs as a group corresponding to the specified component part among the classified groups;

generating the new mesh model using the generated second mesh model and the obtained first mesh models;

selecting the first part of the first CAD models and classifying the first part of the first CAD models into one of the plurality of groups when determining that a quality of a first part of the first CAD models is higher than that of a second part of the second CAD model or a quality of a mesh model corresponding to the first part of the first CAD models is higher than that of a mesh model corresponding to the second part of the second CAD model; and receiving an input of the relation from a user and classifying the selected part of the first CAD models into one of the plurality of groups according to contents of the received relation.

* * * * *